United States Patent
Yagi et al.

(10) Patent No.: US 7,768,584 B2
(45) Date of Patent: Aug. 3, 2010

(54) ACTIVE MATRIX SUBSTRATE, METHOD FOR FABRICATING ACTIVE MATRIX SUBSTRATE, DISPLAY DEVICE, LIQUID CRYSTAL DISPLAY DEVICE, AND TELEVISION DEVICE

(75) Inventors: Toshifumi Yagi, Mie (JP); Tomoki Noda, Mie (JP); Toshihide Tsubata, Mie (JP); Masanori Takeuchi, Mie (JP); Kenji Enda, Nara (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 0 days.

(21) Appl. No.: 12/382,799

(22) Filed: Mar. 24, 2009

(65) Prior Publication Data

US 2009/0225247 A1 Sep. 10, 2009

Related U.S. Application Data

(62) Division of application No. 11/792,563, filed as application No. PCT/JP2005/022935 on Dec. 14, 2005, now Pat. No. 7,714,948.

(30) Foreign Application Priority Data

Dec. 16, 2004 (JP) ............................. 2004-364498
Oct. 7, 2005 (JP) ............................. 2005-295015

(51) Int. Cl.
*G02F 1/1343* (2006.01)
(52) U.S. Cl. .......................................... 349/39; 349/38
(58) Field of Classification Search .................. 349/38, 349/39
See application file for complete search history.

(56) References Cited

U.S. PATENT DOCUMENTS

| 5,953,084 | A | 9/1999 | Shimada et al. |
| 6,175,393 | B1 | 1/2001 | Ban et al. |
| 6,515,720 | B1 | 2/2003 | Iizuka et al. |
| 6,958,791 | B2 | 10/2005 | Shimoshikiryo |
| 2002/0063810 | A1 | 5/2002 | Nakajima |

(Continued)

FOREIGN PATENT DOCUMENTS

EP 0 766 118 4/1997

(Continued)

OTHER PUBLICATIONS

Supplementary European Search Report mailed Mar. 6, 2008 in corresponding EP application 05816826.1.

(Continued)

*Primary Examiner*—K. Cyrus Kianni
(74) *Attorney, Agent, or Firm*—Nixon & Vanderhye, P.C.

(57) ABSTRACT

An active matrix substrate includes a substrate, a TFT formed on the substrate, a storage capacitor element formed on the substrate, an interlayer insulating film covering the storage capacitor element, and a pixel electrode formed on the interlayer insulating film. The storage capacitor element includes a storage capacitor line, an insulating film formed on the storage capacitor line, and two or more storage capacitor electrodes opposed to the storage capacitor line with the insulating film interposed therebetween. The two or more storage capacitor electrodes are electrically connected via associated contact holes formed in the interlayer insulating film to the pixel electrode and electrically continuous with a drain electrode of the TFT.

17 Claims, 26 Drawing Sheets

U.S. PATENT DOCUMENTS

| | | |
|---|---|---|
| 2004/0001167 A1 | 1/2004 | Takeuchi et al. |
| 2004/0173797 A1 | 9/2004 | Kim |
| 2004/0222419 A1 | 11/2004 | Matsui et al. |

FOREIGN PATENT DOCUMENTS

| | | |
|---|---|---|
| JP | 01-303415 | 12/1989 |
| JP | 06-095157 | 4/1994 |
| JP | 07-270824 | 10/1995 |
| JP | 08-000893 | 5/1996 |
| JP | 09-090318 | 4/1997 |
| JP | 09-152625 | 6/1997 |
| JP | 09-222615 | 8/1997 |
| JP | 2004-062146 | 2/2004 |
| JP | 2004-078157 | 3/2004 |
| JP | 2004-318086 | 11/2004 |
| JP | 2004-318086 A | 11/2004 |

OTHER PUBLICATIONS

International Search Report mailed Jan. 31, 2006 (English and Japanese Text).

Second and Supplementary Notice mailed Apr. 19, 2007.

though for a pplications, a further simplification of the fabrication process is desired.

ACTIVE MATRIX SUBSTRATE, METHOD FOR FABRICATING ACTIVE MATRIX SUBSTRATE, DISPLAY DEVICE, LIQUID CRYSTAL DISPLAY DEVICE, AND TELEVISION DEVICE

This application is a divisional application of U.S. patent application Ser. 11/792,563, filed 7 Jun. 2007, now U.S. Pat. No. 7,714,948 which is the U.S. national phase of International Application No. PCT/JP2005/022935 filed 14 Dec. 2005, the entire contents of which are hereby incorporated herein by reference.

TECHNICAL FIELD

The present invention relates to active matrix substrates, methods for fabricating active matrix substrates, display devices, liquid crystal display devices, and television devices, and more particularly relates to active matrix (hereinafter, referred to also as "AM") substrates, for example, having pixels each provided with a thin-film transistor for driving a liquid crystal layer and a storage capacitor element, and AM type liquid crystal devices each including such an AM substrate.

BACKGROUND ART

AM substrates have been widely used for AM type display devices, such as liquid crystal display devices and EL (electroluminescence) display devices. A known AM type liquid crystal display device using such an AM substrate includes a plurality of scanning signal lines formed on the substrate, a plurality of data signal lines crossing the scanning signal lines, thin-film transistors (hereinafter, referred to also as "TFTs") located at the intersections of the above-mentioned signal lines, and other elements. An image signal is transmitted to each of pixel portions of the AM type liquid crystal display device by the switching function of the associated TFTs. Furthermore, the pixel portion may be provided with a storage capacitor element (see, for example, Patent Document 1).

Such a storage capacitor element prevents self-discharge of a liquid crystal layer during a period during which a TFT is in the off state or degradation of the image signal quality due to the off-state current of the TFT and is used not only for storage of the image signal during the period during which the TFT is in the off state but also as a path through which various modification signals are applied to the storage capacitor element to drive liquid crystal. A liquid crystal display device including a storage capacitor element can achieve low power consumption and high image quality.

An example of the known AM substrate configuration will be described hereinafter with reference to the drawings. FIG. 24 is a schematic plan view illustrating the configuration of a portion of an AM substrate corresponding to a pixel including a storage capacitor element. The AM substrate is used for a known AM type liquid crystal display device. FIG. 25 is a schematic cross-sectional view illustrating the cross section of the AM substrate taken along the line A-A' in FIG. 24.

As illustrated in FIGS. 24 and 25, the AM substrate is provided with a plurality of pixel electrodes 51 arranged in a matrix form, scanning signal lines 52 for supplying scanning signals, and data signal lines 53 for supplying data signals. The data signal lines 53 extend along the lateral edges of the pixel electrodes 51, and the scanning signal lines 52 cross the data signal lines 53. TFTs 54 are located, as switching elements connected to the pixel electrodes 51, at the intersections of the scanning signal lines 52 and the data signal lines 53. Each scanning signal line 52 is connected to gate electrodes 62 of the associated TFTs 54, and the drive of each TFT 54 is controlled by a scanning signal fed to the associated gate electrode 62. Each data signal line 53 is connected to source electrodes 66a of the associated TFTs 54, and a data signal is fed to the source electrode 66a of the associated TFT 54. Furthermore, a drain electrode 66b is connected through a connection electrode 55 to one of electrodes (an upper storage capacitor electrode 55a) of a storage capacitor element, and the electrode of the storage capacitor element is further connected via an associated contact hole 56 formed in an interlayer insulating film 68 to the associated pixel electrode 51. A storage capacitor (common) line 57 is formed on a transparent insulating substrate (insulating substrate) 61, and the storage capacitor (common) line 57 functions as the other electrode (lower storage capacitor electrode) of the storage capacitor element.

As illustrated in FIG. 25, the gate electrode 62 is formed on the transparent insulating substrate (insulating substrate) 61 made of glass, plastic, or any other material so as to be connected to the associated scanning signal line 52. The scanning signal line 52 and the gate electrode 62 are formed of a metal film made of titanium, chromium, aluminum, molybdenum, or any other metal, an alloy of these metals, or a layered film of these metals. The storage capacitor (common) line 57 functioning as the other electrode (lower storage capacitor electrode) of the storage capacitor element is formed of the same material as the scanning signal line 52 and the gate electrode 62. A gate insulating film 63 covering the storage capacitor (common) line 57, the scanning signal line 52 and the gate electrode 62 is formed of an insulating film made of silicon nitride, silicon oxide, or any other material. A high-resistance semiconductor layer 64 made of amorphous silicon, polysilicon or any other material and a low-resistance semiconductor layer made of n+ amorphous silicon further doped with impurities, such as phosphorus, are formed on the gate insulating film 63 to overlap the gate electrode 62. The low-resistance semiconductor layer is changed into a source electrode 66a and a drain electrode 66b.

Each data signal line 53 is formed so as to be connected to the associated source electrodes 66a. Furthermore, the connection electrode 55 is formed so as to be connected to the associated drain electrode 66b and extends continuously with one of the electrodes of the storage capacitor element, i.e., the upper storage capacitor electrode 55a. The upper storage capacitor electrode 55a is connected via the contact hole 56 to the pixel electrode 51. The data signal line 53, the connection electrode 55 and the upper storage capacitor electrode 55a are formed of the same material, such as a metal film made of titanium, chromium, aluminum, molybdenum, or any other metal, an alloy of these metals, or a layered film of these metals.

The pixel electrode 51 is formed of a transparent conductive film made of, for example, indium tin oxide (ITO), indium zinc oxide (IZO), zinc oxide, or tin oxide. The contact hole 56 passes through the interlayer insulating film 68 covering the TFT 54, the scanning signal line 52, the date signal line 53, and the connection electrode 55. As a material of the interlayer insulating film 68, use is made of, for example, an acrylic resin, silicon nitride, silicon oxide, or any other material. An AM substrate configured as illustrated in FIGS. 24 and 25 is disclosed, for example, in Patent Document 2.

For an AM substrate of such a configuration, in order to simplify a fabrication process and reduce the production cost, the storage capacitor (common) line (lower storage capacitor electrode) 57 is formed in the same process step as the scanning signal line 52, and the upper storage capacitor electrode 55a is formed in the same process step as the data signal line 53 and the connection electrode 55. Furthermore, in a case where, as illustrated in FIG. 25, the pixel electrode 51 covers the interlayer insulating film 68, this allows the pixel electrode 51 to overlap the signal lines 52 and 53. This overlapping increases the aperture ratio of a pixel and further has the effect of shielding electric fields from the signal lines 52 and 53 to the pixel electrode 51. In the above-mentioned case, the contact hole 56 is formed in a part of the interlayer insulating film 68 on a pattern forming the storage capacitor (common) line 57 or a pattern forming the scanning signal line 52. This provides connection between the pixel electrode 51 and the upper storage capacitor electrode 55a, and the upper storage capacitor electrode 55a is connected through the connection electrode 55 to the drain electrode 66b, thereby providing connection between the pixel electrode 51 and the drain electrode 66b. The location at which the contact hole 56 is formed is not limited within a region of the interlayer insulating film 68 located on the upper storage capacitor electrode 55a and may be within a region thereof located on the connection electrode 55. As illustrated in FIG. 24, the contact hole 56 is preferably formed within the region of the interlayer insulating film 68 located on the upper storage capacitor electrode 55a formed on a pattern forming the storage capacitor (common) line 57. The reason for this is that if the contact hole 56 is formed within the above-mentioned region, this prevents a reduction in the aperture ratio from being further caused.

For the storage capacitor element of the AM substrate illustrated in FIGS. 24 and 25, when conductive foreign particles (dust or particles) or a pin hole 99 exist in a part of the gate insulating film 63 between the storage capacitor line (lower storage capacitor electrode) 57 and the upper storage capacitor electrode 55a, this causes a short circuit between the storage capacitor line (lower storage capacitor electrode) 57 and the upper storage capacitor electrode 55a. Thus, the pixel in which a short circuit has occurred is found as a point defect on a display image. This should be improved. Furthermore, also when poor etching or poor photolithography cause a short circuit between the data signal line 53 and the upper storage capacitor electrode 55a which are formed in the same process step due to defects, such as an unnecessarily left part 98 of a film, a point defect likewise occurs and cannot be repaired. This should be devised.

For example, a liquid crystal display panel using vertically alignment (VA) liquid crystal, such as a multi-domain vertical alignment (MVA) liquid crystal, is set such that, under the condition that no voltage is applied to a liquid crystal, an associated pixel is displayed in black. In a case where a short circuit is caused between the data signal line 53 and the upper storage capacitor electrode 55a, a data signal is fed to the pixel electrode 51 without passing through the TFT 54. This prevents the data signal fed to the pixel electrode 51 from being able to be controlled by a scanning signal. In view of the above, the pixel is not displayed in black even on the condition that no voltage is applied to the liquid crystal but recognized as a bright dot. The bright dot generated when the whole area of the panel is displayed in black is more conspicuous than a black dot or a dark dot generated when the whole area thereof is displayed in white. As a result, the display quality is significantly affected by the bright dot. Techniques for repairing such point defects are disclosed in, for example, Patent Documents 3 through 5.

In recent years, pixels have increased in size with an increase in the screen areas of thin television sets. Accordingly, a defective pixel has come to be large enough to be unignorable from the viewpoint of the display quality. A technique has been developed in which, in order to reduce the size of a defective pixel, the size of a point defect is decreased by dividing one pixel into a plurality of subpixels. In this technique, a pattern becomes complicated by dividing one pixel into a plurality of subpixels, resulting in the reduced aperture ratio of the pixel. For example, for a 26-inch wide extended graphics array (WXGA) display, the aperture ratio of a pixel is reduced approximately 4% through 5%.

The structure of a liquid crystal display device in which adjacent pixels share a storage capacitor line to increase the aperture ratio of each pixel is disclosed in, for example, Patent Documents 6 and 7. More specifically, even when a pixel is divided into, for example, two subpixels, the existence of conductive foreign particles or a pin hole in a part of an insulating layer between a storage capacitor line (lower storage capacitor electrode) and an upper storage capacitor electrode causes a short circuit therebetween. The subpixel in which a short circuit occurs is recognized as a point defect on a display image. However, as compared with a case where a pixel is not divided, the area of the point defect is reduced to half. As a result, the display quality is insignificantly affected by the point defect.

FIG. 26 is a plan view schematically illustrating the configuration of a portion of an AM substrate corresponding to a pixel divided into a plurality of subpixels. FIG. 27 is a schematic cross-sectional view of the AM substrate taken along the line B-B' in FIG. 26. In FIGS. 26 and 27, the same components as those illustrated in FIGS. 24 and 25 are denoted by the same reference numerals.

As illustrated in FIGS. 26 and 27, a pixel electrode 51 is divided into two subpixel electrodes 51L and 51R. A scanning signal line 52 for supplying scanning signals is located in the vicinity of the border between these subpixel electrodes 51L and 51R, and a data signal line 53 for supplying data signals extends along the lateral edges of the pixel electrode 51. TFTs 54L and 54R serving as switching elements are located at the intersection of the scanning signal line 52 and the data signal line 53 so as to be connected to the subpixel electrodes 51L and 51R. The scanning signal line 52 is interposed between the TFTs 54L and 54R when viewed in plan. The scanning signal line 52 is connected to gate electrodes 62L and 62R of the TFTs 54L and 54R. The drive of the TFTs 54L and 54R is controlled by scanning signals fed to the gate electrodes 62L and 62R. Furthermore, the data signal line 53 is connected to source electrodes 66a of the TFTs 54L and 54R, and thus data signals are fed to the source electrodes of the TFTs 54L and 54R. Moreover, drain electrodes 66b are connected through connection electrodes 55L and 55R to respective ones (upper storage capacitor electrodes) 55La and 55Ra of electrodes of storage capacitor elements and further connected via contact holes 56L and 56R formed in an interlayer insulating film 68 to the subpixel electrodes 51L and 51R. A storage capacitor (common) line 57 is formed on a transparent insulating substrate (insulating substrate) 61 and functions as the other electrodes (lower storage capacitor electrodes) of the storage capacitor elements. In other words, the respective upper storage capacitor electrodes 55La and 55Ra of adjacent pixels share the storage capacitor (common) line 57 as the other electrodes (lower storage capacitor electrodes) of the storage capacitor elements. The AM substrate illustrated in FIGS. 26 and 27 can be fabricated through the similar process steps to those through which the AM substrate illustrated in FIGS. 24 and 25 are fabricated.

For the AM substrate illustrated in FIGS. 26 and 27, the storage capacitor (common) line 57 is formed in the vicinity of the border between adjacent pixels to suppress a reduction in the aperture ratio of each pixel. In order to ensure sufficient storage capacity, the areas of the upper storage capacitor electrodes 55La and 55Ra opposed to the storage capacitor (common) line 57 need to be as large as possible. In view of the above, since the respective upper storage capacitor electrodes 55La and 55Ra of adjacent pixels are close to each other, it is likely to cause current leakage failures between the upper storage capacitor electrodes 55La and 55Ra adjacent to each other.

In a case where a current leakage failure is caused, two subpixel electrodes 51L and 51R sharing a storage capacitor (common) line 57 become electrically continuous, resulting in combined defects. In order to avoid this, a repair needs to be made to defects to prevent a data signal for an adjacent pixel from being fed to the pixel. For example, in order to prevent a data signal from entering from an upper storage capacitor electrode 55La of one (first pixel) of adjacent pixels into a subpixel electrode 51R of a second pixel adjacent to the first pixel, a part of the subpixel electrode 51R of the second pixel located in a contact hole 56R is removed. In this manner, the subpixel electrode 51R is electrically isolated from the upper storage capacitor electrode 55Ra. Furthermore, in order to prevent a data signal from entering through a drain electrode 66b of the second pixel and the upper storage capacitor electrodes 55La and 55Ra into a subpixel electrode 51L of the first pixel, a connection electrode 55R of the second pixel is electrically isolated from the upper storage capacitor electrode 55Ra. In view of the above, a subpixel of one (second pixel) of the adjacent pixels is nonenergized, leading to a point defect.

In other words, for an AM substrate in which a pixel is divided into a plurality of subpixels, a point defect less significantly affects the display quality than for an AM substrate in which a pixel is not divided. The AM substrate in which a pixel is divided into a plurality of subpixels may cause a current leakage failure between adjacent upper storage capacitor electrodes 55La and 55Ra, resulting in an increase in the possibility of bringing about a point defect. This should be improved.

Patent Document 1: Japanese Unexamined Patent Application Publication No. 6-95157 (page 1)

Patent Document 2: Japanese Unexamined Patent Application Publication No. 9-152625 (pages 8 through 11 and 19, FIGS. 3 and 4)

Patent Document 3: Japanese Unexamined Patent Application Publication No. 1-303415

Patent Document 4: Japanese Unexamined Patent Application Publication No. 9-222615

Patent Document 5: Japanese Unexamined Patent Application Publication No. 7-270824

Patent Document 6: Japanese Unexamined Patent Application Publication No. 2004-62146

Patent Document 7: Japanese Unexamined Patent Application Publication No. 2004-78157

DISCLOSURE OF THE INVENTION

Problems that the Invention is to Solve

An object of the present invention is to repair point defects at an AM substrate. Another object of the present invention is to improve production yields by repairing point defects.

Means of Solving the Problems

The present invention solves the above-mentioned problems in the following manner: Two or more upper storage capacitor electrodes are opposed to a storage capacitor line, associated contact holes are formed in an interlayer insulating film covering the upper storage capacitor electrodes, and a pixel electrode on the interlayer insulating film is electrically connected via the contact holes to the upper storage capacitor electrodes.

The present invention will be specifically described with reference to the drawings. FIG. 1 is a plan view schematically illustrating an AM substrate 12 according to an aspect of the present invention, and FIG. 2 is a cross-sectional view taken along the line II-II in FIG. 1.

The AM substrate 12 of this aspect includes a substrate 31, an active element (for example, a TFT 24) formed on the substrate 31, a storage capacitor element 20 formed on the substrate 31, an interlayer insulating film 38 covering the storage capacitor element 20, and a pixel electrode 21 formed on the interlayer insulating film 38. The storage capacitor element 20 includes a storage capacitor line 27 formed on the substrate 31, an insulating film (e.g., a gate insulating film 33) covering the storage capacitor line 27, and three upper storage capacitor electrodes 25a, 25b and 25c opposed to the storage capacitor line 27 with the gate insulating film 33 interposed therebetween. The TFT 24 includes a gate electrode 32 extending along the row direction from a scanning signal line 22 extending along the column direction, a gate insulating film 33 covering the gate electrode 32, a high-resistance semiconductor layer 34 formed on the gate electrode 32 with the gate insulating film 33 interposed therebetween, and a source electrode 36a and a drain electrode 36b formed on the high-resistance semiconductor layer 34. The source electrode 36a is connected to a data signal line 23 extending along the row direction, and the drain electrode 36b is connected through a connection electrode 25 to the upper storage capacitor electrode 25b.

The three upper storage capacitor electrodes 25a, 25b and 25c are electrically connected via contact holes 26a, 26b and 26c formed in the interlayer insulating film 38 to a pixel electrode 21. Thus, the three upper storage capacitor electrodes 25a, 25b and 25c become electrically continuous through the pixel electrode 21. Thus, while a data signal fed through the connection electrode 25 to the upper storage capacitor electrode 25b is fed to the pixel electrode 21, the data signal is fed also to the upper storage capacitor electrodes 25a and 25c. In other words, the same electrical potential is applied to the three upper storage capacitor electrodes 25a, 25b and 25c.

Next, the process step of repairing a point defect will be described. In a case where a short circuit is caused between a storage capacitor line 27 and upper storage capacitor electrodes 25a and 25c due to conductive foreign particles and pin holes 99 in a gate insulating film 33, the electrical potential supplied to the storage capacitor line 27 is applied through the upper storage capacitor electrodes 25a and 25c to a pixel electrode 21. Since the same electrical potential is typically applied to a counter electrode (not shown) opposed to the pixel electrode 21 and the storage capacitor line 27, no voltage is applied between the pixel electrode 21 and the counter electrode. In view of the above, while such a pixel of a liquid crystal display device operating in a normally white mode is recognized as a bright dot, such a pixel of a liquid crystal display device operating in a normally black mode is recognized as a black dot.

Furthermore, in a case where data signal lines 23 are shorted to upper storage capacitor electrodes 25a and 25c due to defects, such as unnecessarily left parts 98 of the films, a data signal is fed to the pixel electrode 21 without passing through a TFT 24. This prevents a data signal fed to the pixel electrode 21 from being able to be controlled by a scanning signal. On the condition that no voltage is applied to the pixel electrode 21, such a pixel of a liquid crystal display device operating in a normally white mode is not displayed in white, and such a pixel of a liquid crystal display device operating in a normally black mode is not displayed in black.

In order to repair such point defects, parts of the pixel electrode 21 in contact holes 26a and 26c formed on the shorted upper storage capacitor electrodes 25a and 25c are removed by a laser or any other method. This allows the shorted upper storage capacitor electrodes 25a and 25c to be isolated from the pixel electrode 21. This isolation can prevent an electrical potential from being applied through the storage capacitor line 27 and the upper storage capacitor electrodes 25a and 25c to the pixel electrode 21. Accordingly, although the storage capacity of the storage capacitor element becomes smaller than in normal cases, the pixel can be driven at near normal levels.

On the other hand, in a case where a short circuit is caused between an upper storage capacitor electrode 25b connected to a connection electrode 25 and a storage capacitor line 27 due to conductive foreign particles and a pin hole, a part of the pixel electrode 21 in a contact hole 26b formed on the shorted upper storage capacitor electrodes 25b is removed by a laser or any other method. This allows the shorted upper storage capacitor electrode 25b to be isolated from the pixel electrode 21. Furthermore, when the connection electrode 25 is broken at the location K by a laser or any other method, this can prevent a data signal line 23 from being shorted through the TFT 24 to the storage capacitor line 27. At the same time, the pixel electrode 21 is also isolated from the TFT 24. Therefore, the pixel electrode 21 is allowed to become electrically continuous with the storage capacitor line 27 by melting the other upper storage capacitor electrodes 25a and 25c (parts of the upper storage capacitor electrodes 25a and 25c other than parts thereof located under the contact holes 26a and 26c) using a laser or any other method. In this manner, the pixel electrode 21 and the storage capacitor line 27 can be at the same potential. In view of the above, for example, for a liquid crystal display device operating in a normally black mode, its region corresponding to the pixel electrode 21 is displayed in black, and the above-mentioned defect can be repaired so as to be recognized as a microdefect.

For the AM substrate 12 of this aspect, the area (first area) of a region of the storage capacitor line 27 on which the upper storage capacitor electrode 25b connected to the connection electrode 25 is placed is smaller than the total area (second area) of regions of the storage capacitor line 27 on which the upper storage capacitor electrodes 25a and 25c prevented from being connected to the connection electrode 25 are placed. The ratio between the first area and the second area can be appropriately selected according to the reliability of contact between the upper storage capacitor electrodes 25a, 25b and 25c and the pixel electrode 21, the probability of short circuits between the storage capacitor line 27 and the upper storage capacitor electrodes 25a, 25b and 25c, and other factors.

In some cases, it may be more difficult to connect the pixel electrode 21 to the upper storage capacitor electrodes 25a and 25c via the contact holes 26a and 26c with excellent coverage than to connect the pixel electrode 21 to the upper storage capacitor electrode 25b via the contact hole 26b with excellent coverage. Furthermore, the contact resistance between a metal film made of aluminum or any other metal and forming upper storage capacitor electrodes and a film made of ITO or the like and forming the pixel electrode 21 may be large. In such cases, the upper storage capacitor electrodes 25a and 25c may be prevented from functioning as electrodes of storage capacitor elements. To cope with this, the first area is set to be larger than the second area. In this way, the ratio of the first area to the total area of the first and second areas becomes high. As a result, a large storage capacity can be secured according to the ratio of the first area.

For the AM substrate 12 of this aspect, the number of a connection electrode 25 through which a TFT 24 is connected to an upper storage capacitor electrode is one. Therefore, the aperture ratio can be restrained from decreasing as compared with a case where a connection electrode 25 is connected to all upper storage capacitor electrodes 25a, 25b and 25c.

For the AM substrate 12 illustrated in FIG. 1, a TFT 24 is connected through a connection electrode 25 to an upper storage capacitor electrode 25b. However, no connection electrode for providing connection between a TFT 24 and an upper storage capacitor electrode has to be provided. When no connection electrode is provided, this can further restrain the aperture ratio from decreasing. For example, a contact hole may be formed in a part of an interlayer insulating film 38 located on a drain electrode 36b of a TFT 24, and a pixel electrode 21 may be connected via the contact hole to the drain electrode 36b. In this manner, the electrical potential of a data signal can be applied through the pixel electrode 21 to upper storage capacitor electrodes 25a, 25b and 25c.

Furthermore, the location of the contact hole 26b is not limited within a region of the interlayer insulating film 38 located on the upper storage capacitor electrode 25b and can be within a region thereof located on the connection electrode 25. However, when, as illustrated in FIG. 1, the contact hole 26b is formed in a region of the interlayer insulating film 38 located within a pattern of a storage capacitor line 27 and on the upper storage capacitor electrode 25b, this can restrain the aperture ratio from decreasing.

In another aspect of the present invention, when the AM substrate 12 of the present invention is used for a liquid crystal display device operating in a MVA mode, a connection electrode 25 is formed to correspond to a region of the AM substrate 12 provided with a slit (provided without any electrode layer) or a region of a counter substrate provided with a rib (projection) projecting toward a liquid crystal layer. This can restrain the aperture ratio from decreasing due to provision of the connection electrode 25.

For the AM substrate 12 of this aspect, the planar shape of each of upper storage capacitor electrodes 25a, 25b and 25c is a quadrilateral but not restrictive. It may be a triangle, a semicircle, a trapezoid, or any other shape. The three upper storage capacitor electrodes 25a, 25b and 25c are placed on a gate insulating film 33 to overlap a pattern of the storage capacitor line 27. Since the upper storage capacitor electrodes are formed of the same film as data signal lines 23, they are likely to be shorted to the data signal lines 23 due to unnecessarily left parts 98 of the films. Therefore, as illustrated in FIG. 1, the upper storage capacitor electrodes 25a and 25c near the data signal lines 23 are preferably isolated from the upper storage capacitor electrode 25b connected to the connection electrode 25. These three upper storage capacitor electrodes are obtained by dividing the above-mentioned same film into three as illustrated in FIG. 1. However, the number (N) into which the film is divided to obtain upper storage capacitor electrodes is not restrictive and need only be equal to or larger than two.

A storage capacitor line 27 is typically formed of the same material as scanning signal lines 22 and a gate electrode 32. However, a material of the storage capacitor line 27 is not restrictive. For example, before and after the formation of the scanning signal lines 22 and the gate electrode 32, a storage capacitor line 27 may be formed using any other material (e.g., a transparent conductive film made of ITO or the like).

For the AM substrate 12 of this aspect, an insulating film forming part of a storage capacitor element 20 corresponds to only a gate insulating film 33 as illustrated in FIG. 2. However, this is not restrictive. For example, before or after the formation of the gate insulating film 33, an insulating film other than the gate insulating film 33 may be formed on the storage capacitor line 27. In this way, a layered film including the gate insulating film 33 may be formed.

The AM substrate of the present invention can be utilized for display devices, such as liquid crystal display devices and organic and inorganic EL display devices. Still another aspect of the present invention provides a display device. A display device of the present invention includes the AM substrate of the present invention, a counter electrode opposed to the AM substrate, and a display medium layer placed in the gap between the AM substrate and the counter electrode. The "display medium layer" herein means a layer in which the amount of light is adjusted according to the voltage applied to the layer or the current supplied thereto, and examples of the display medium layer include a layer in which the optical transmittance (optical reflectivity) of light from a light source or ambient light is modulated and a self-luminous layer. Specific examples of the display medium layer include, for example, a liquid crystal layer, inorganic or organic EL layer, or other layers.

The "counter electrode" herein means an electrode opposed to a pixel electrode on the AM substrate, and examples of the counter electrode include a common (whole-area) electrode and a stripe electrode. For example, in a case of an organic EL display device, an anode corresponds to the pixel electrode, and a cathode corresponds to the counter electrode. The counter electrode may be formed of an optically reflective conductive film made of aluminum, silver, or any other material or a transparent conductive film made of ITO, IZO, zinc oxide, tin oxide, or any other material.

Yet another aspect of the present invention provides a liquid crystal display device. The liquid crystal display device of the present invention includes the AM substrate of the present invention, a counter substrate having a surface on which a counter electrode opposed to the AM substrate is formed, and a liquid crystal layer placed in the gap between the AM substrate and the counter substrate. The counter substrate is typically a transparent insulating substrate made of glass, plastic, or any other material.

In the display device and the liquid crystal display device of the present invention, the same electrical potential may be applied to a storage capacitor line and a counter electrode. In an organic EL display device, on condition that repair of a point defect in an AM substrate provides electrical continuity between a pixel electrode and a storage capacitor line, if the storage capacitor line and the counter electrode are at the same potential, no current will flow through an organic EL layer (typically, an electron-transporting layer, light-emitting layer or a hole-transporting layer). This prevents a light-emitting region (pixel) from emitting light. In other words, since the light-emitting region is displayed as a black dot, a point defect is less likely to be conspicuous.

In the liquid crystal display device, on condition that repair of a point defect in the AM substrate provides electrical continuity between a pixel electrode associated with a defective pixel and the storage capacitor line, if the storage capacitor line and the counter electrode are at the same potential, no voltage will be applied to a liquid crystal layer. In a case where the liquid crystal layer is a vertical alignment type liquid crystal layer containing nematic liquid crystal material having a negative dielectric anisotropy, the liquid crystal display device is typically driven in a normally black mode. Therefore, the repaired pixel is displayed in black. As a result, the point defect is less likely to be conspicuous.

On the other hand, in a case where the liquid crystal layer is a twist-aligned liquid crystal layer containing nematic liquid crystal material having a positive dielectric anisotropy, the liquid crystal display device is typically driven in a normally white mode. In this case, a pixel electrode associated with a defective pixel is allowed to be electrically continuous with a storage capacitor line, and a different potential from the potential supplied to a counter electrode is supplied to the storage capacitor line, thereby applying a predetermined voltage to the liquid crystal layer. A predetermined voltage (at which a pixel is displayed in black) is applied to the liquid crystal layer, for example, by supplying the potential at which the pixel is displayed in black to the storage capacitor line. Therefore, the repaired pixel is displayed as a black dot. As a result, the point defect is less likely to be conspicuous.

EFFECTS OF THE INVENTION

According to the present invention, a point defect in an AM substrate can be repaired. This can improve production yields.

Figure 1:
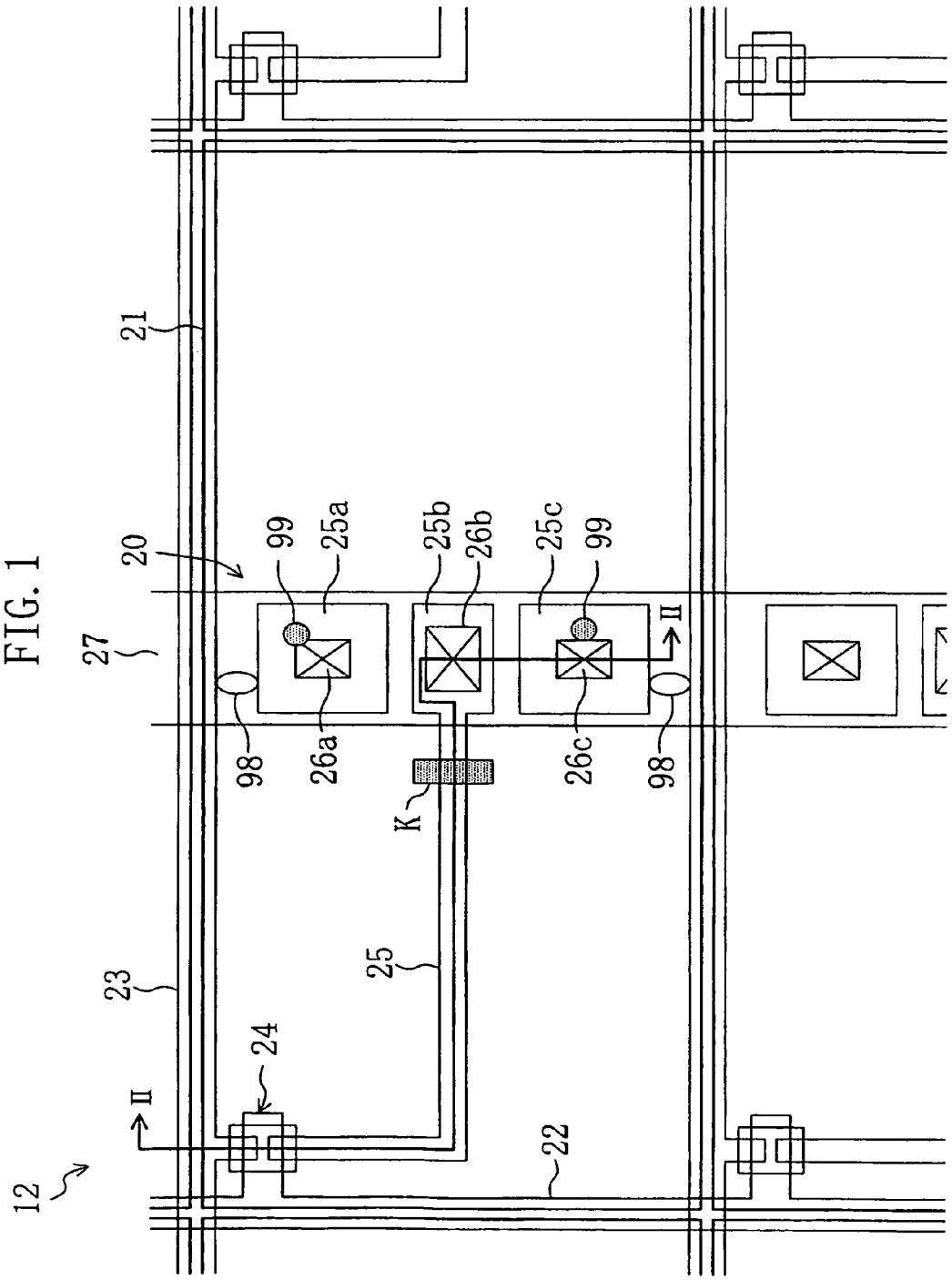
FIG. 1 is a plan view schematically illustrating an AM substrate 12 according to an aspect of the present invention.
Figure 2:
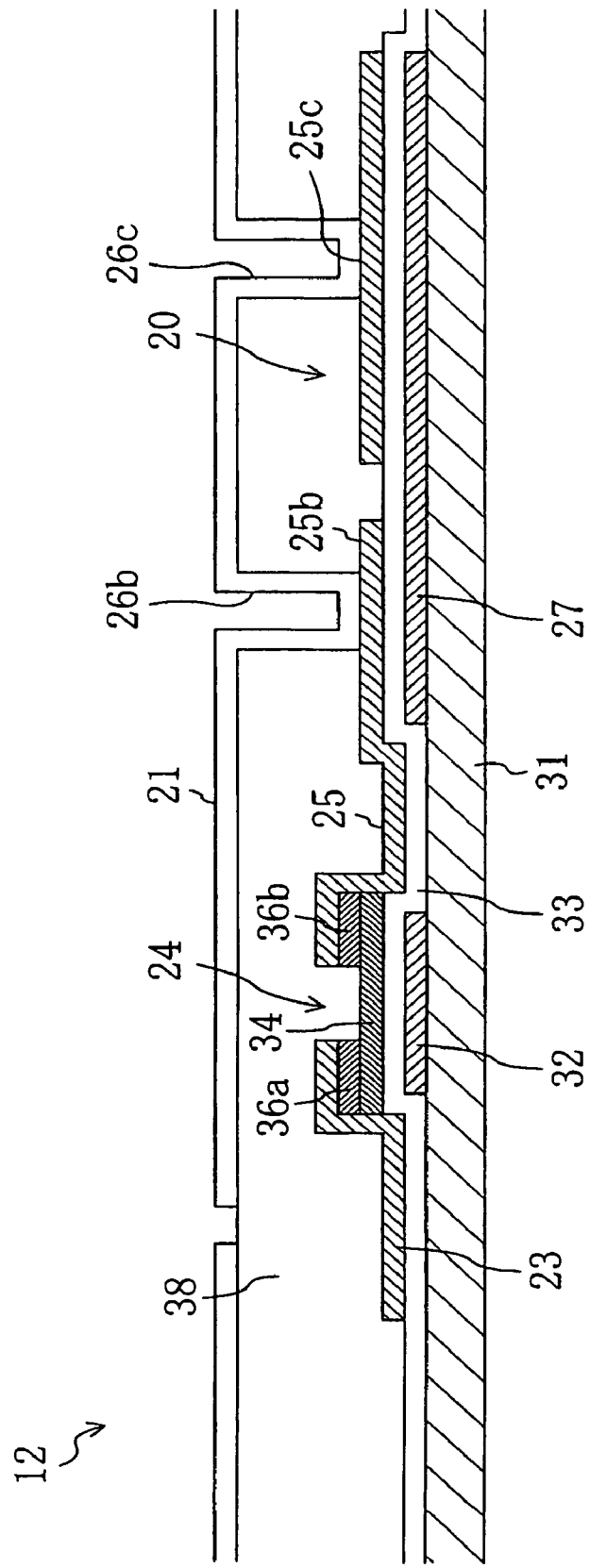
FIG. 2 is a cross-sectional view taken along the line II-II in FIG. 1.

DESCRIPTION OF REFERENCE NUMERALS 10 liquid crystal display device
11 tuner
12 AM substrate
13 counter substrate
14 liquid crystal layer (display medium layer)
15 television device
20 storage capacitor element
20R first storage capacitor element
20L second storage capacitor element
21 pixel electrode
21R subpixel electrode (first pixel electrode)
21L subpixel electrode (second pixel electrode)
22 scanning signal lines
22a first scanning line
22b second scanning line
23 data signal lines
24, 24L, 24R TFTs (active elements)
25L, 25R connection electrodes
25a, 25b, 25c, 25d upper storage capacitor electrodes
26a, 26b, 26c, 26d contact holes
27 storage capacitor (common) line
27a, 38c slits
31 substrate
32, 32R gate electrodes
33 gate insulating film
34 high-resistance semiconductor layer
36a source electrode
36b drain electrode
37b black matrix
38 interlayer insulating film
39 counter electrode
98 unnecessarily left part of film (short-circuited portion)

BEST MODE FOR CARRYING OUT THE INVENTION

Embodiments of the present invention will be described hereinafter with reference to the drawings. However, the present invention is not limited to the embodiments described below. In order to generally indicate similar components, alphabets in reference numerals may be omitted. In other words, the components may be denoted by only numerals in reference numerals. For example, a first scanning signal line 22a and a second scanning signal line 22b may be generally expressed as scanning signal lines 22.

In each of AM substrates described in the following embodiments, a plurality of subpixels into which a pixel is divided are driven by the same scanning signal line and the same data signal line. Furthermore, adjacent pixels along the data signal line share the same storage capacitor (common) line. An upper storage capacitor electrode is formed on the storage capacitor (common) line with an insulating film interposed therebetween while being divided into three or more pieces. Two or more of the three or more pieces into which the upper storage capacitor electrode is divided are connected through associated connection electrodes to a TFT located in the vicinity of the intersection of the scanning signal line and the data signal line. The other piece/pieces of the upper storage capacitor electrode to which no connection electrode is connected is connected to a subpixel electrode forming a subpixel.

On condition that the upper storage capacitor electrode is divided into a plurality of upper storage capacitor electrodes, if failures, such as current leakage between one of the upper storage capacitor electrodes and the storage capacitor line, the data signal line or an upper storage capacitor electrode of an adjacent pixel, are caused, a repair is made to an associated defective pixel by electrically isolating the upper storage capacitor electrode from which a current has leaked. In a case where this repair prevents current from passing through the associated subpixel, continuity between the associated subpixel electrode and the storage capacitor (common) line is provided by applying laser light or the like to the divided electrode (upper storage capacitor electrode) that is not connected to any connection electrode. In this manner, the electrical potential of the storage capacitor (common) line can be applied to the subpixel electrode. When the same electrical potential is applied to the storage capacitor (common) line and a counter electrode, no voltage is applied to a liquid crystal layer interposed between the subpixel electrode and the counter electrode. For a vertical alignment type liquid crystal display device driven in a normally black mode, the repaired pixel is displayed in black. As a result, a point defect becomes less conspicuous.

On the other hand, for a twist-alignment type liquid crystal display device driven in a normally white mode, a predetermined voltage (the voltage at which a pixel is displayed in black) is applied to a liquid crystal layer, for example, by supplying the potential at which the pixel is displayed in black to a storage capacitor (common) line. Therefore, the repaired pixel is displayed as a black dot. As a result, a point defect becomes less conspicuous. In view of the above, the above-mentioned repair allows a defective pixel to be recognized as a minute point defect, which is ignorable in terms of display quality, and can improve production yields.

Embodiment 1

Figure 3:
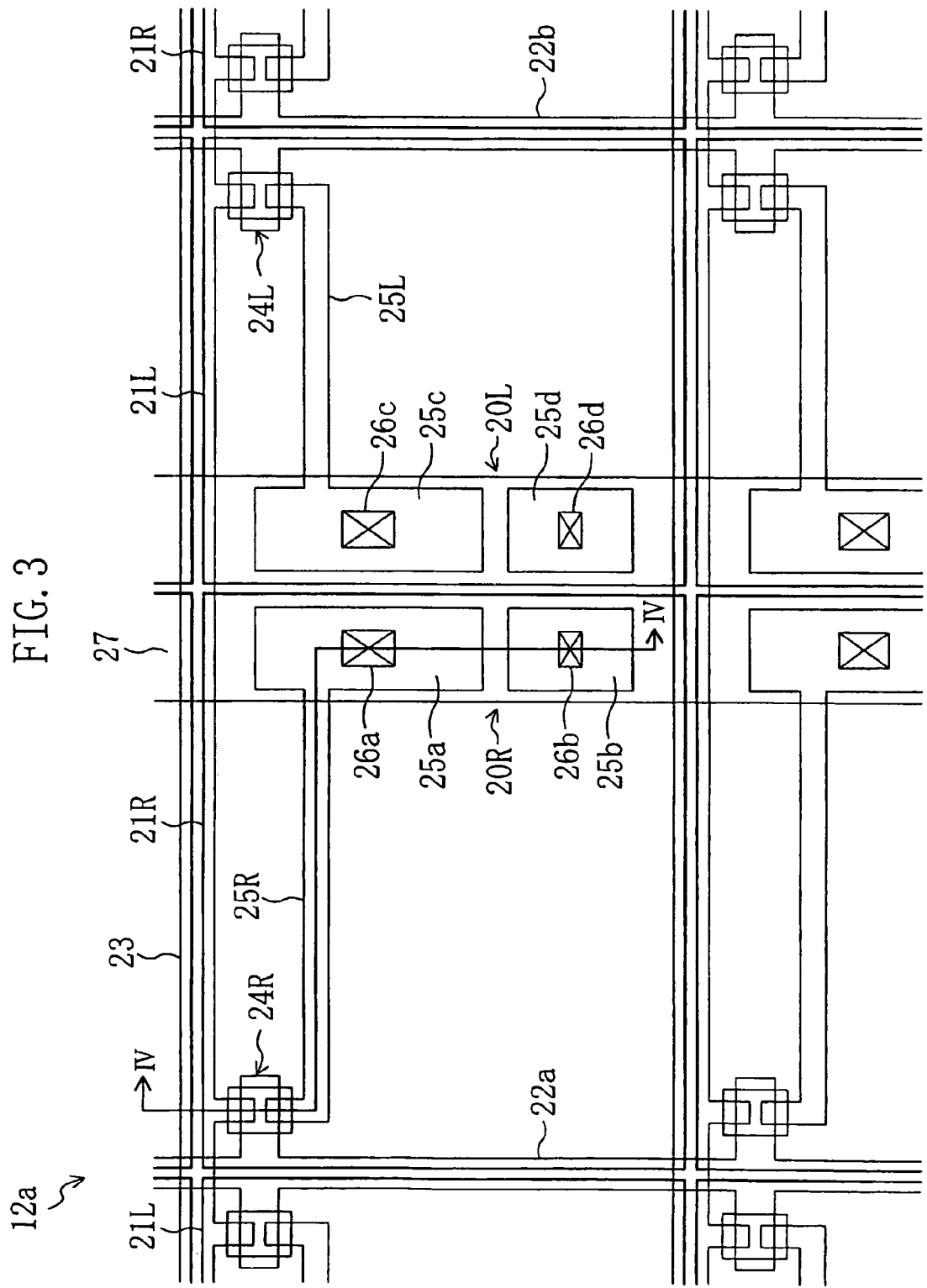
FIG. 3 is a plan view schematically illustrating an AM substrate 12a according to a first embodiment.
Figure 4:
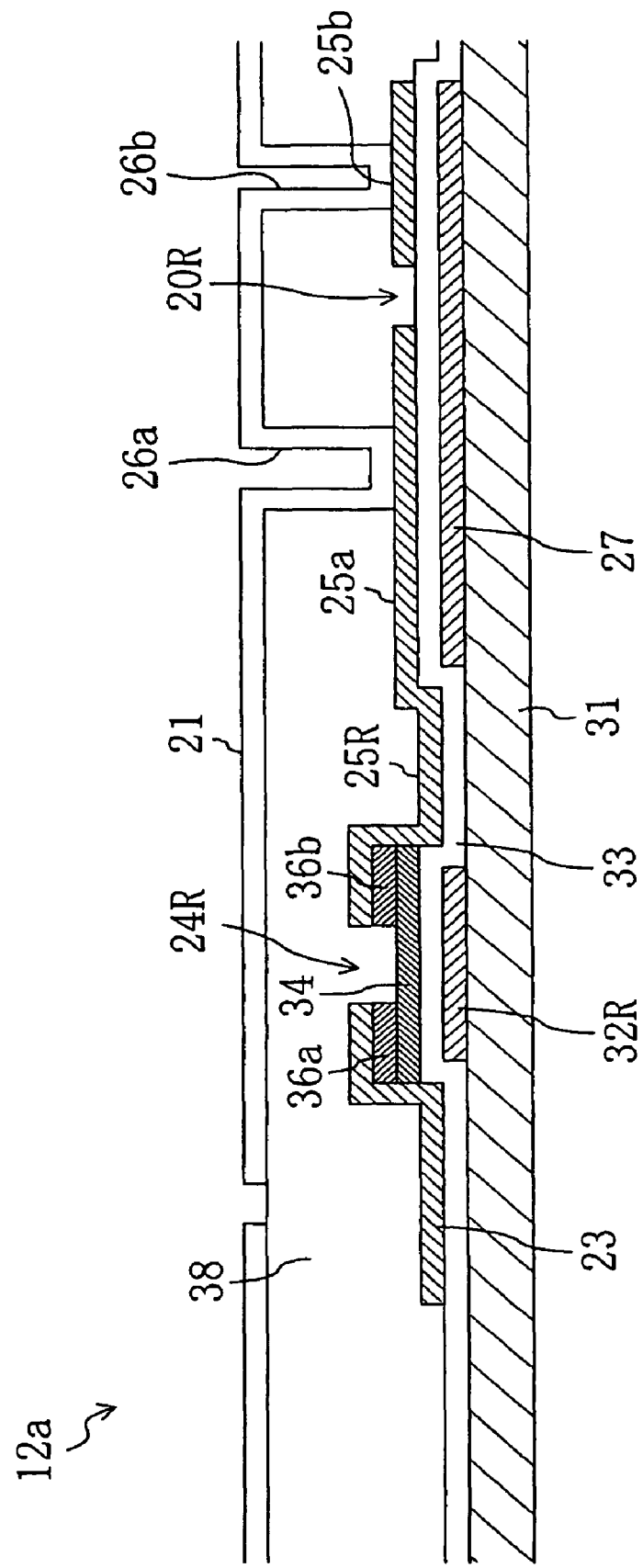
FIG. 4 is a cross-sectional view taken along the line IV-IV in FIG. 3.

FIG. 3 is a plan view schematically illustrating an AM substrate 12a of this embodiment. FIG. 4 is a cross-sectional view taken along the line IV-IV in FIG. 3. The AM substrate 12a of this embodiment takes on a Cs-on-Common structure in which a storage capacitor line is formed as a lower electrode of a storage capacitor element. The AM substrate 12a of this embodiment is configured such that a pixel is divided into two subpixels and each adjacent pair of pixels share a storage capacitor line.

Each subpixel herein is the smallest unit of display. Two or more subpixels which are selected by a scanning signal supplied to the same scanning signal line and a data signal supplied to the same data signal line and to which the same data signal is fed form one pixel. Furthermore, three pixels corresponding to R, G and B form one picture element. A pixel (or subpixel) region of an AM type liquid crystal display device is defined by a pixel electrode (or a subpixel electrode) and a counter electrode opposed to the pixel electrode (or the subpixel electrode). When the AM type liquid crystal display device is provided with a black matrix, a region of the AM type liquid crystal display device to which, in order to display an image, a voltage is applied and which corresponds to an opening of the black matrix strictly corresponds to the pixel (or subpixel) region.

The AM substrate 12a of this embodiment has a plurality of pixels arranged in a matrix form. Two subpixels arranged along the row direction form one pixel. To be specific, as illustrated in FIG. 3, each of pixel electrodes is divided into two subpixel electrodes (a first pixel electrode and a second pixel electrode) 21R and 21L. Scanning signal lines 22 for supplying scanning signals are located in the vicinity of the borders between the subpixel electrodes 21R and 21L and adjacent subpixel electrodes of the same pixel to extend along the column direction (longitudinally in this figure). Data signal lines 23 for supplying data signals are located along the lateral edges of the pixel electrodes to extend along the row direction (laterally in this figure). TFTs 24R and 24L are located, as switching elements connected to the associated subpixel electrodes 21R and 21L, at the intersections of the scanning signal lines 22 and the data signal lines 23. Each scanning signal line 22 and the associated adjacent TFTs 24R and 24L are arranged along the row direction with the scanning signal line 22 interposed between the associated TFTs 24R and 24L when viewed in plan.

Each scanning signal line 22 is connected to respective gate electrodes of the associated TFTs 24R and 24L. The drive of the TFTs 24R and 24L is controlled by a scanning signal fed to the gate electrodes. One of the data signal lines 23 is connected to respective source electrodes 36a of the associated TFTs 24R and 24L, and a data signal is fed thereto. Drain electrodes 36b are connected through associated connection electrodes 25L and 25R to respective ones (upper storage capacitor electrodes) 25a and 25c of the electrodes of associated storage capacitor elements and further connected to the subpixel electrodes 21R and 21L via contact holes 26a and 26c formed in an interlayer insulating film 38.

FIG. 3 illustrates a right subpixel electrode 21R located at the left side of a storage capacitor (common) line 27 and included in a first pixel and a left subpixel electrode 21L included in a second pixel adjacent to the first pixel along the row direction (to the right side of the first pixel). The subpixel electrode 21R included in the first pixel is the right one of two subpixel electrodes selected by a scanning signal supplied to a first scanning signal line 22a and a data signal supplied to a data signal line 23. The subpixel electrode 21L included in the second pixel is the left one of two subpixel electrodes selected by a scanning signal supplied to a second scanning signal line 22b adjacent to the first scanning signal line along the row direction and a data signal supplied to the data signal line 23.

The two subpixels have a first storage capacitor element 20R and a second storage capacitor element 20L, respectively, each having a pair of electrodes between which an insulating film is interposed. The first and second storage capacitor elements 20R and 20L share a storage capacitor (common) line 27 formed on a transparent insulating substrate (insulating substrate) 31. The storage capacitor (common) line 27 functions as one of the pair of electrodes of each storage capacitor element. A gate insulating film 33 covers the storage capacitor (common) line 27. The other electrode (upper storage capacitor electrode) of the storage capacitor element is formed so as to be opposed to the storage capacitor (common) line 27 with the gate insulating film 33 interposed therebetween. The upper storage capacitor electrode opposed to the storage capacitor (common) line 27 is divided into four, i.e., upper storage capacitor electrodes 25a and 25b of the first storage capacitor element 20R and upper storage capacitor electrodes 25c and 25d of the second storage capacitor element 20L. These upper storage capacitor electrodes 25a, 25b, 25c, and 25d are placed on a pattern of the storage capacitor (common) line 27.

For the AM substrate 12a of this embodiment, connection electrodes 25R and 25L are connected to the upper storage capacitor electrodes 25a and 25c of the storage capacitor elements 20R and 20L, respectively. A nontransparent material is typically used as a material of the connection electrodes 25R and 25L. Therefore, regions of the AM substrate 12a in which the connection electrodes 25R and 25L are formed become nontransparent. Since the connection electrodes 25R and 25L are therefore hardly utilized as the aperture of an associated pixel, the aperture ratio of the pixel can be enhanced by connecting the connection electrodes 25R and 25L to only the upper storage capacitor electrodes 25a and 25c, respectively, as compared with a case where each of the connection electrodes is connected to both the associated upper storage capacitor electrodes. However, in a case where regions of the AM substrate 12a corresponding to the connection electrodes 25R and 25L are allowed to overlap regions thereof provided with ribs, slits or the like, each connection electrode is preferably connected to both of associated upper storage capacitor elements.

A cross-sectional structure of a subpixel electrode 21R included in a first pixel will be described with reference to FIG. 4. A gate electrode 32R is formed on a transparent insulating substrate (insulating substrate) 31 made of glass, plastic or any other material so as to be connected to a first scanning signal line 22a. The first scanning signal line 22a and the gate electrode 32R are formed of a metal film made of titanium, chrome, aluminum, molybdenum, or any other metal, an alloy of these metals, or a layered film thereof. A storage capacitor (common) line 27 functioning as a lower storage capacitor electrode of a storage capacitor element is typically formed of the same material as the first scanning signal line 22a and the gate electrode 32R. A gate insulating film 33 covering the storage capacitor (common) line 27, the first scanning signal line 22a and the gate electrode 32R is formed of an insulating film made of silicon nitride, silicon oxide, or any other material. A high-resistance semiconductor layer 34 made of amorphous silicon, polysilicon, or any other material and a low-resistance semiconductor layer made of n+ amorphous silicon doped with impurities, such as phosphorus, or any other material are formed on the gate insulating film 33 to overlap the gate electrode 32R. The low-resistance semiconductor layer will be a source electrode 36a and a drain electrode 36b.

A data signal line 23 is formed so as to be connected to the source electrode 36a. Furthermore, a connection electrode 25R is formed so as to be connected to the drain electrode 36b and formed continuously with one of upper storage capacitor electrodes, i.e., an upper storage capacitor electrode 25a. The upper storage capacitor electrode 25a is connected via a contact hole 26a to a subpixel electrode 21R.

The other upper storage capacitor electrode 25b is connected via a contact hole 26b to the subpixel electrode 21R. In summary, the two upper storage capacitor electrodes 25a and 25b are configured so as to be electrically connected through the subpixel electrode 21R to each other. The data signal line 23, the connection electrode 25 and the upper storage capacitor electrodes 25a and 25b are typically formed of the same material, e.g., a metal film made of titanium, chrome, aluminum, molybdenum, or any other metal, an alloy of these metals, or a layer film thereof. The pixel electrodes 21R and 21L are formed of a transparent conductive film, such as ITO, IZO, zinc oxide, or tin oxide. The contact holes 26a and 26b pass through an interlayer insulating film 38 covering a TFT 24R, the scanning signal line 22a, the data signal line 23, and the connection electrode 25. For example, an acrylic resin, silicon nitride, silicon oxide, or any other material is used as a material of the interlayer insulating film 38.

Next, the process step of repairing a point defect in the AM substrate 12a of this embodiment will be described. In the AM substrate 12a of this embodiment, in order to ensure a sufficient storage capacity, the area of each of the upper storage capacitor electrodes 25a through 25d opposed to the storage capacitor (common) line 27 need to be as large as possible. For this reason, upper storage capacitor electrodes of a subpixel are formed near upper storage capacitor electrodes of another subpixel adjacent to the subpixel in the row direction. Therefore, it is likely to cause a current leakage failure between each pair of the upper storage capacitor electrodes which are adjacent to each other in the row direction. Furthermore, a short circuit may be caused between the data signal line 23 and the upper storage capacitor electrode 25a due to a defect, such as an unnecessarily left part of a film. Moreover, a short circuit may be caused between the upper storage capacitor electrode 25a and the storage capacitor line 27 due to conductive foreign particles or pin holes in the gate insulating film 33.

Figure 5:
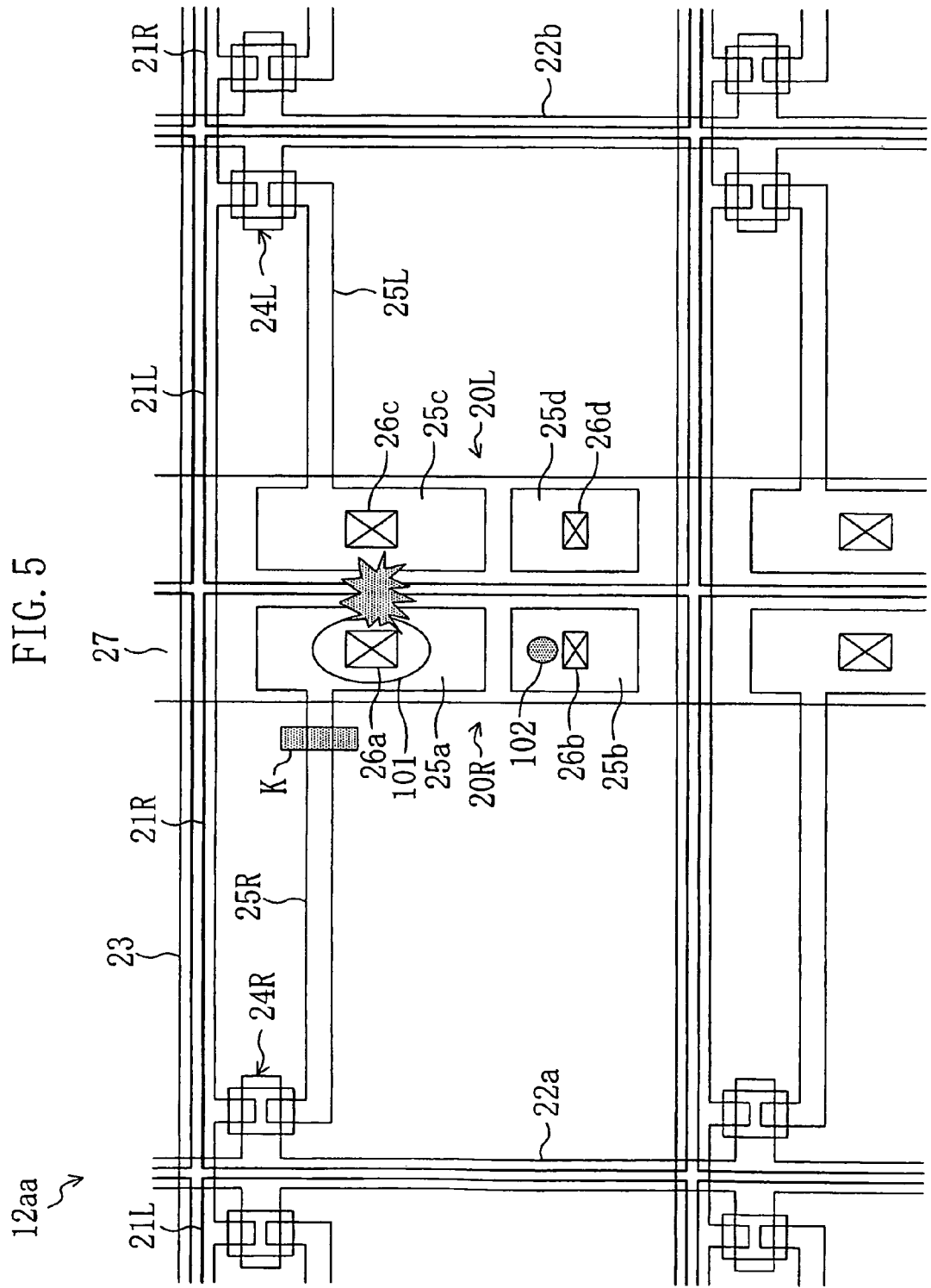
FIG. 5 is a plan view for schematically explaining a repair process step in a case where a short circuit is caused between upper storage capacitor electrodes 25a and 25c.

FIG. 5 is a plan view for schematically explaining a repair process step for a short circuit caused between adjacent upper storage capacitor electrodes 25a and 25c connected to connection electrodes 25R and 25L, respectively. In an AM substrate 12aa to be repaired, a short circuit is caused between the upper storage capacitor electrodes 25a and 25c due to an unnecessarily left part of a film. This allows adjacent subpixel electrodes 21R and 21L to be electrically connected to each other through the shorted upper storage capacitor electrodes 25a and 25c and contact holes 26a and 26c, resulting in combined defects.

Figure 6:
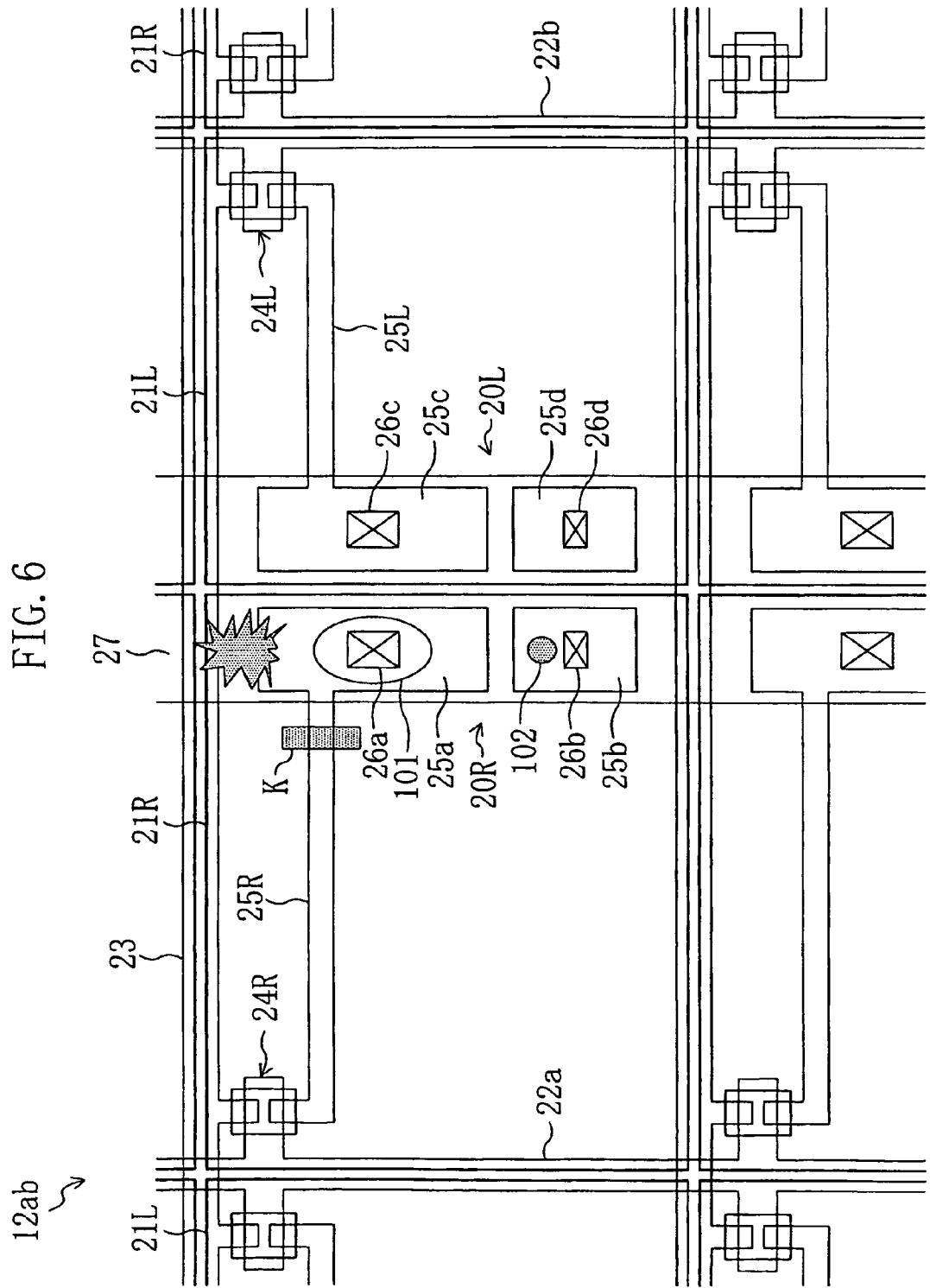
FIG. 6 is a plan view for schematically explaining a repair process step in a case where a short circuit is caused between the upper storage capacitor electrode 25a and a data signal line 23.

FIG. 6 is a plan view for schematically explaining a repair process step for a short circuit caused between an upper storage capacitor electrode 25a connected to a connection electrode 25R and a data signal line 23. In an AM substrate 12ab to be repaired, a short circuit is caused between the data signal line 23 and the upper storage capacitor electrode 25a due to defects, such as an unnecessarily left part of a film. Thus, a data signal is fed through the data signal line 23 and the upper storage capacitor electrode 25a to a subpixel electrode 21R.

Figure 7:
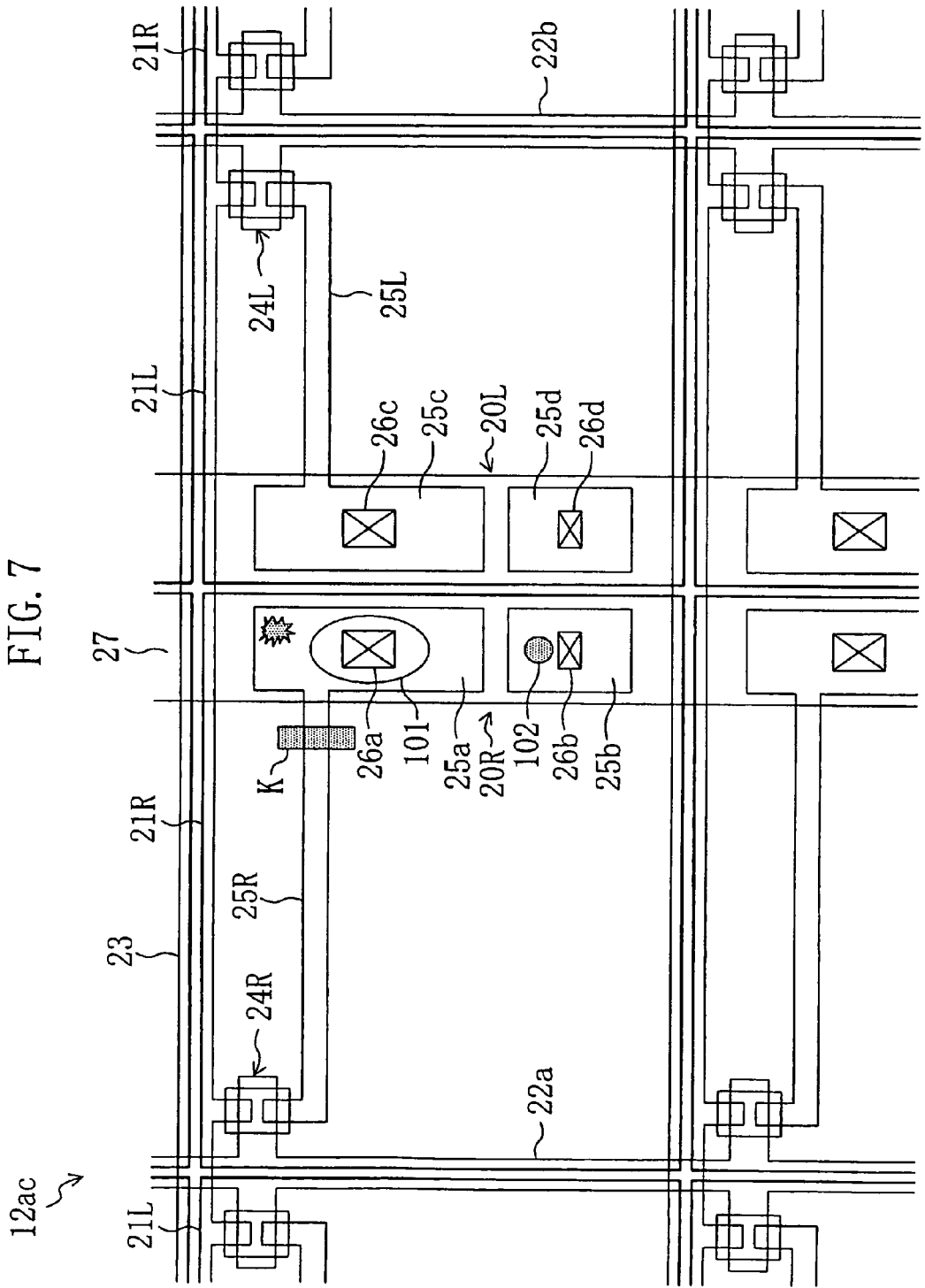
FIG. 7 is a plan view for schematically explaining a repair process step in a case where a short circuit is caused between an upper storage capacitor electrode 25a and a storage capacitor line 27.

FIG. 7 is a plan view for schematically explaining a repair process step for a short circuit caused between an upper storage capacitor electrode 25a connected to a connection electrode 25R and a storage capacitor line 27. In an AM substrate 12ac to be repaired, a short circuit is caused between the upper storage capacitor electrode 25a and the storage capacitor line 27 due to conductive foreign particles or pin holes in a gate insulating film 33. As a result, the shorted pixel is recognized as a point defect on a display image.

In a case where an upper storage capacitor electrode 25a connected to a connection electrode 25R is shorted to an adjacent upper storage capacitor electrode 25c, an associated data signal line 23, or an associated storage capacitor line 27, short circuits between subpixel electrodes 21R and 21L can be solved by removing a part 101 of the subpixel electrode 21R located in a contact hole 26a formed on the shorted upper storage capacitor electrode 25a. Furthermore, the shorted upper storage capacitor electrode 25a can be isolated by breaking the connection electrode 25R at the location K using a laser. This isolation can prevent current from leaking, through a TFT 24R, between the data signal line 23 and the storage capacitor line 27 when the TFT 24R is in the ON state.

The subpixel electrode 21R is also electrically isolated from the TFT 21R simultaneously with the above-mentioned isolation so as to be nonenergized. For this reason, the other upper storage capacitor electrode 25b (except for its part on which a contact hole 26b is formed) is melted by a laser 102 or the like, thereby providing continuity through the upper storage capacitor electrode 25b between the subpixel electrode 21R and the storage capacitor (common) line 27. This allows the subpixel electrode 21R and the storage capacitor (common) line 27 to be at the same potential. In view of the above, for a liquid crystal display device having an AM substrate 12a repaired in the above-mentioned manners, its region corresponding to the subpixel electrode 21R is displayed in black, and thus a defect in this region can be repaired so as to be recognized as a microdefect.

Figure 8:
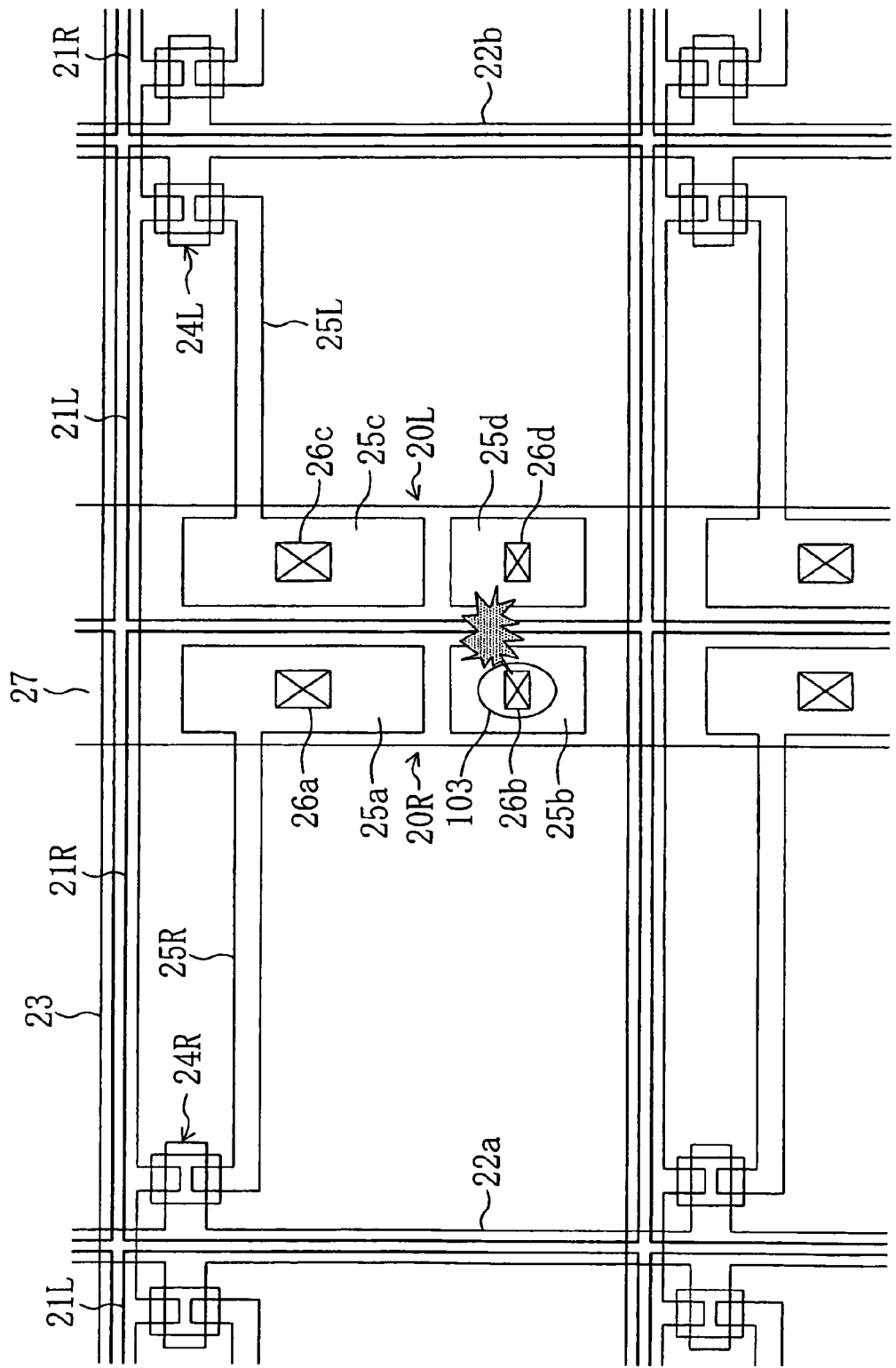
FIG. 8 is a plan view for schematically explaining a repair process step in a case where a short circuit is caused between the upper storage capacitor electrode 25b and an upper storage capacitor electrode 25d.

FIG. 8 is a plan view for schematically explaining a repair process step for a short circuit caused between an upper storage capacitor electrode 25b that is not connected to a connection electrode 25R and an upper storage capacitor electrode 25d adjacent to the upper storage capacitor electrode 25b. In an AM substrate 12ad to be repaired, a short circuit is caused between the upper storage capacitor electrodes 25b and 25d due to an unnecessarily left part of a film. This allows adjacent subpixel electrodes 21R and 21L to be electrically connected to each other through the shorted upper storage capacitor electrodes 25b and 25d and contact holes 26b and 26d, resulting in combined defects.

Figure 9:
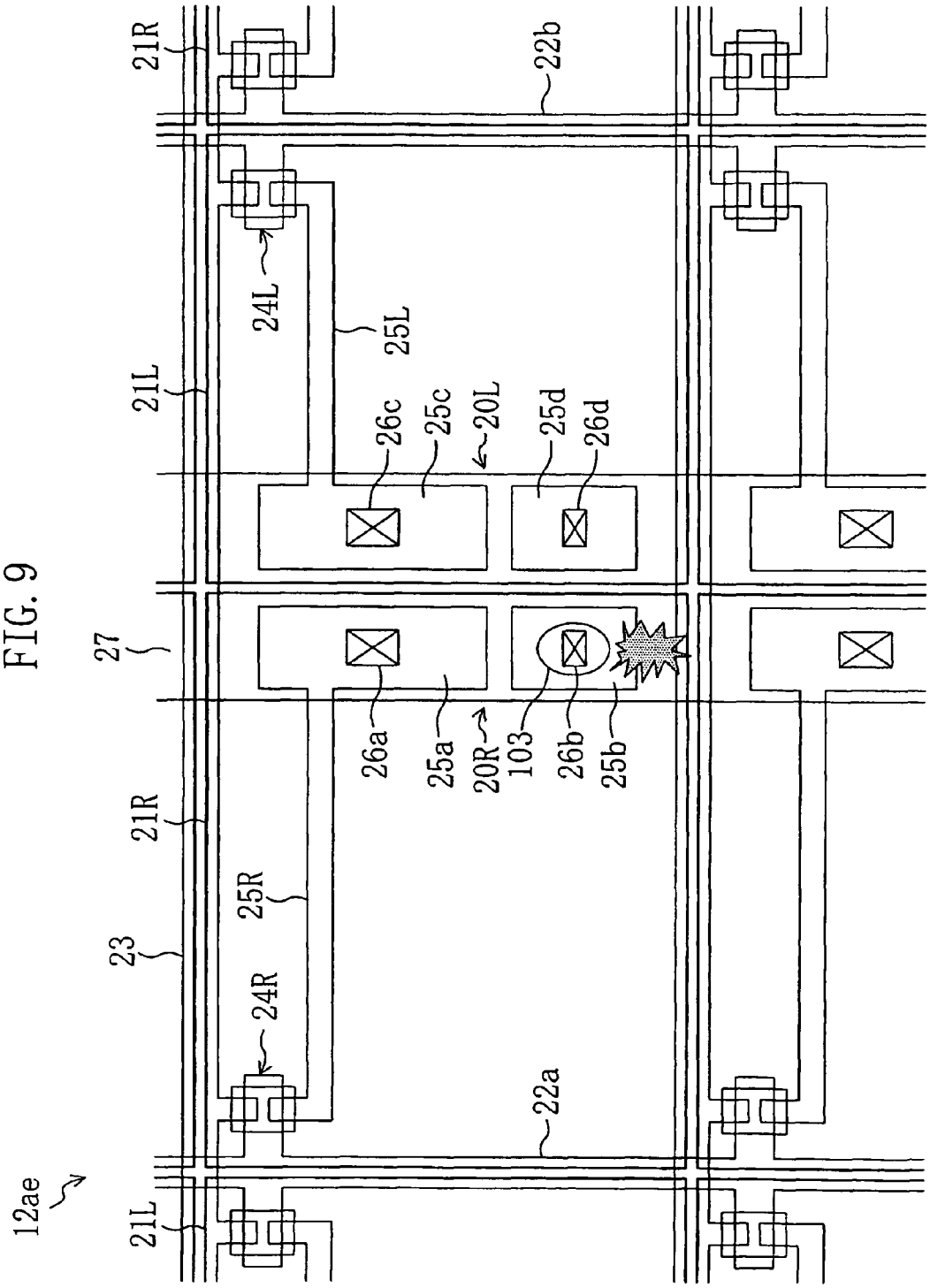
FIG. 9 is a plan view for schematically explaining a repair process step in a case where a short circuit is caused between the upper storage capacitor electrode 25b and the data signal line 23.

FIG. 9 is a plan view for schematically explaining a repair process step for a short circuit caused between an upper storage capacitor electrode 25b that is not connected to a connection electrode 25R and a data signal line 23. In an AM substrate 12ae to be repaired, a short circuit is caused between the data signal line 23 and the upper storage capacitor electrode 25b due to defects, such as an unnecessarily left part of a film. Thus, a data signal is fed through the data signal line 23 and the upper storage capacitor electrode 25b to a subpixel electrode 21R.

Figure 10:
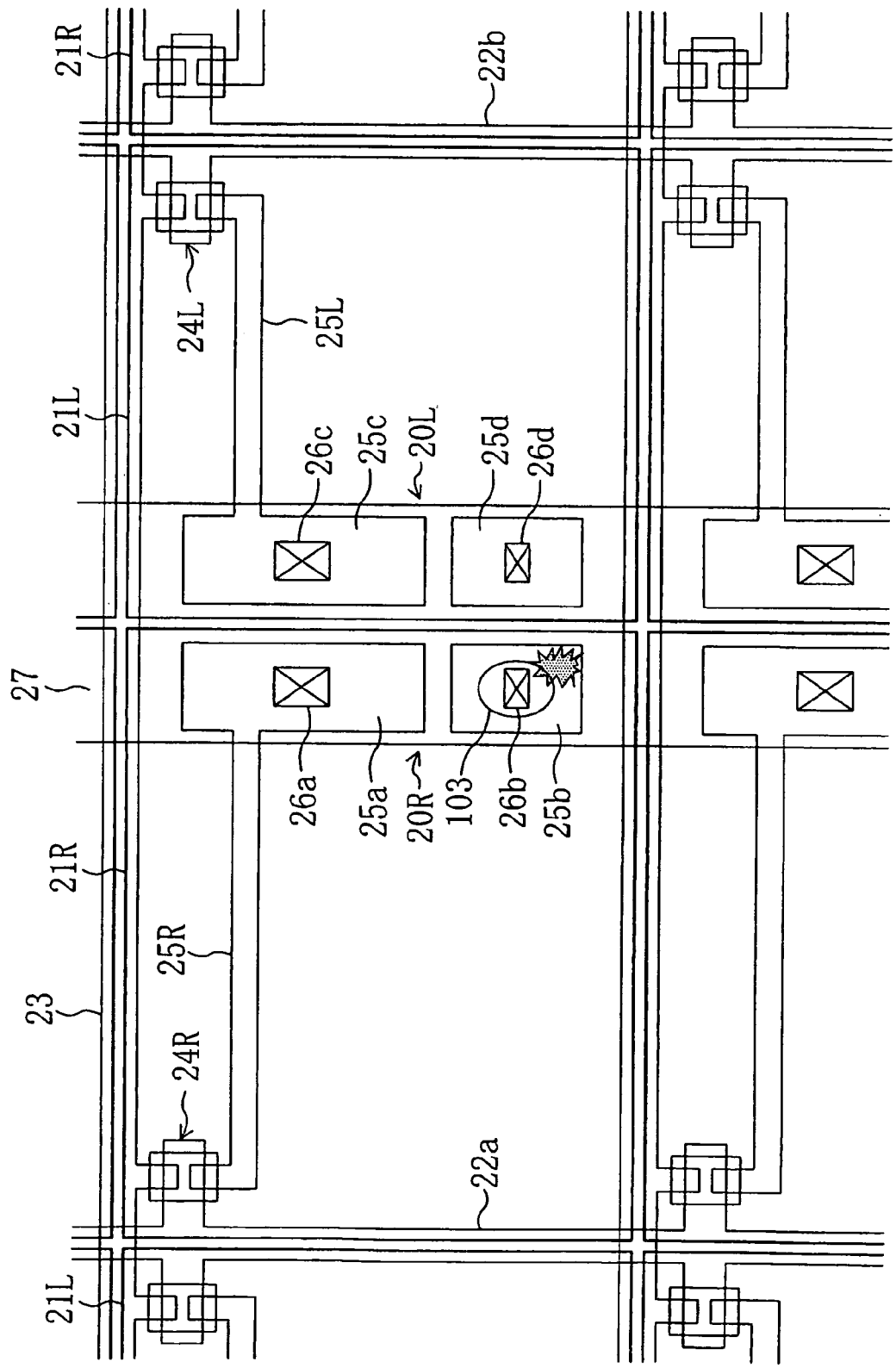
FIG. 10 is a plan view for schematically explaining a repair process step in a case where a short circuit is caused between the upper storage capacitor electrode 25b and the storage capacitor line 27.

FIG. 10 is a plan view for schematically explaining a repair process step for a short circuit caused between an upper storage capacitor electrode 25b that is not connected to a connection electrode 25R and a storage capacitor line 27. In an AM substrate 12*af* to be repaired, a short circuit is caused between the upper storage capacitor electrode 25*b* and the storage capacitor line 27 due to conductive foreign particles or pin holes in a gate insulating film 33. As a result, the shorted pixel is recognized as a point defect on a display image.

In a case where an upper storage capacitor electrode 25*b* that is not connected to a connection electrode 25R is shorted to an adjacent upper storage capacitor electrode 25*d*, an associated data signal line 23 or an associated storage capacitor line 27, a part 103 of the subpixel electrode 21R located in a contact hole 26*b* formed on the shorted upper storage capacitor electrode 25*b* is removed by a laser or the like. In this manner, the shorted upper storage capacitor electrode 25*b* can be isolated from a subpixel electrode 21R. This isolation can prevent an electrical potential from being applied through the storage capacitor line 27 and the upper storage capacitor electrode 25*b* to the subpixel electrode 21R. In view of the above, an associated subpixel can be driven at near normal levels.

Embodiment 2

The AM substrate 12*a* of the first embodiment is set such that the total area (first area) of regions of the storage capacitor line 27 on which the upper storage capacitor electrodes 25*a* and 25*c* connected to the connection electrodes 25R and 25L are placed is larger than that (second area) of regions thereof on which the upper storage capacitor electrodes 25*b* and 25*d* prevented from being connected to the connection electrodes 25R and 25L are placed.

It may be more difficult to connect the subpixel electrodes 21R and 21L via the contact holes 26*b* and 26*d* to the upper storage capacitor electrodes 25*b* and 25*d* with excellent coverage than to connect the subpixel electrodes 21R and 21L via the contact holes 26*a* and 26*c* to the upper storage capacitor electrodes 25*a* and 25*c* with excellent coverage. Furthermore, the contact resistance between a metal film forming upper storage capacitor electrodes and containing aluminum or any other metal and a film forming the subpixel electrodes 21R and 21L and made of ITO or any other material may be large. In these cases, the upper storage capacitor electrodes 25*b* and 25*d* may be prevented from functioning as electrodes of storage capacitor elements. To cope with this, the first area is set to become larger than the second area, thereby increasing the ratio of the first area to the total of the first and second areas. This can ensure a large storage capacity proportional to the ratio of the first area.

However, if a short circuit between the upper storage capacitor electrodes 25*a* and 25*c* connected to the connection electrodes 25R and 25L and other elements (e.g., the storage capacitor line 27) is more likely to be caused than reduction in reliability of contact between the subpixel electrodes 21R and 21L and the upper storage capacitor electrodes 25*a* and 25*c*, the first area may be set to be smaller than the second area.

Figure 11:
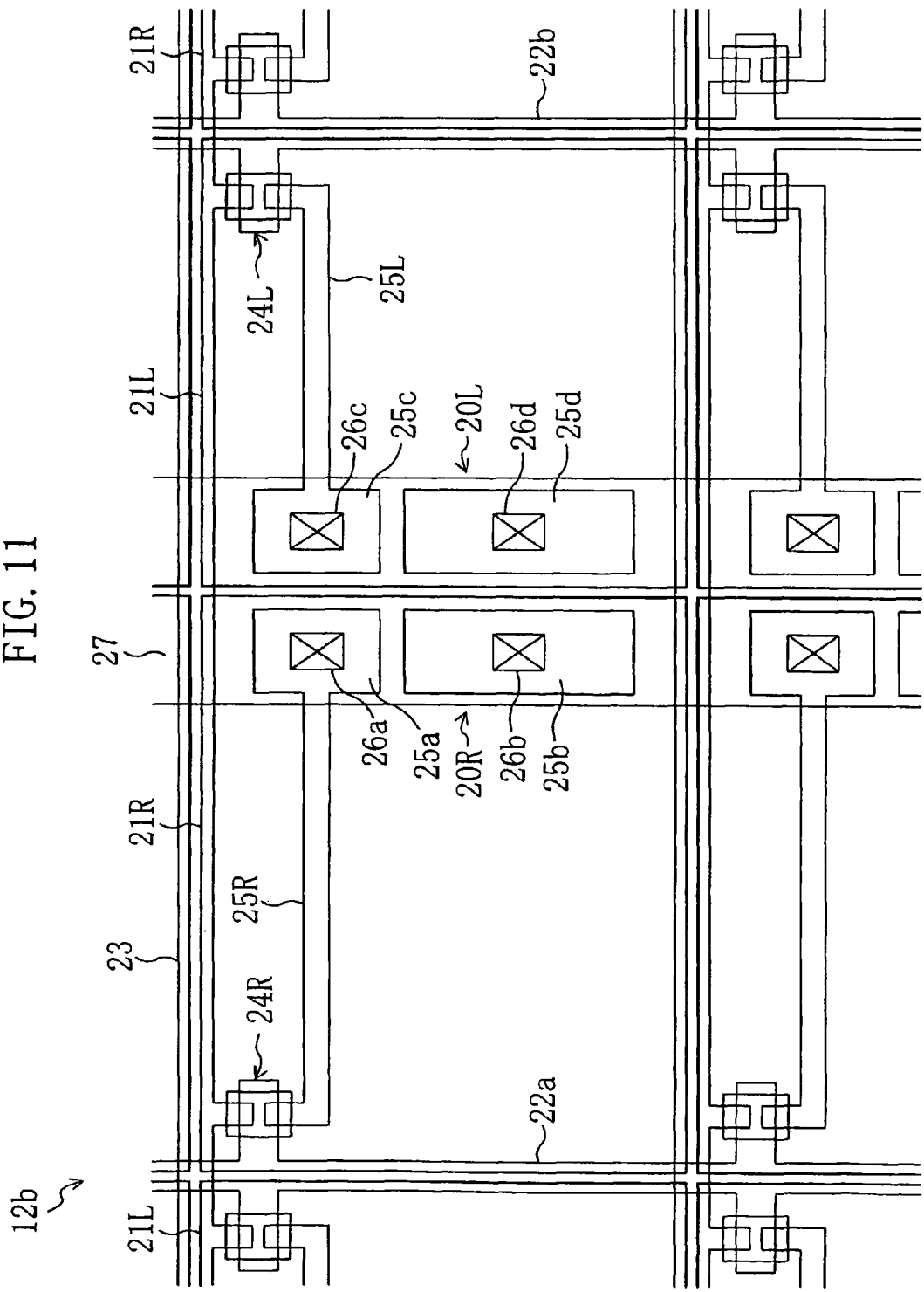
FIG. 11 is a plan view schematically illustrating an AM substrate 12b of a second embodiment set such that the total area of regions of a storage capacitor line 27 on which upper storage capacitor electrodes 25a and 25c are placed becomes smaller than the area of regions of the storage capacitor line 27 on which upper storage capacitor electrodes 25b and 25d are placed.

FIG. 11 is a plan view schematically illustrating an AM substrate 12*b* set such that the total area of regions of a storage capacitor line 27 on which upper storage capacitor electrodes 25*a* and 25*c* connected to connection electrodes 25R and 25L are placed becomes smaller than that of regions thereof on which upper storage capacitor electrodes 25*b* and 25*d* prevented from being connected to the connection electrodes 25R and 25L are placed. The same reference numerals are given to the same components as in the first embodiment, and thus the components having the same reference numerals as in the first embodiment will not be described.

The AM substrate 12*b* of this embodiment is set such that the total area (first area) of regions of the storage capacitor line 27 on which the upper storage capacitor electrodes 25*a* and 25*c* connected to the connection electrodes 25R and 25L are placed becomes smaller than that (second area) of regions thereof on which the upper storage capacitor electrodes 25*b* and 25*d* prevented from being connected to the connection electrodes 25R and 25L are placed. Therefore, if the upper storage capacitor electrodes 25*a* and 25*c* connected to the connection electrodes 25R and 25L are shorted to other elements, a large storage capacity proportional to the ratio of the second area to the total area of the first and second areas can be secured.

Embodiment 3

For the AM substrate 12*b* of the second embodiment, as illustrated in FIG. 11, the upper storage capacitor electrodes 25*a* and 25*b* corresponding to the right one (first subpixel) of two subpixels included in the first pixel located at the left side of the storage capacitor line 27 (the left one of the two subpixels is only partially shown) are arranged to be symmetrical to the upper storage capacitor electrodes 25*c* and 25*d* corresponding to the left one (second subpixel) of two subpixels included in the second pixel located at the right side of the storage capacitor line 27 (the right one of the two subpixels is only partially shown). In other words, the upper storage capacitor electrode 25*a* associated with the first subpixel and connected to the connection pixel 25R is adjacent to the upper storage capacitor electrode 25*c* associated with the second subpixel and connected to the connection electrode 25L in a direction crossing the direction in which the storage capacitor line 27 extends, and the upper storage capacitor electrode 25*c* prevented from being connected to the connection electrode 25R is adjacent to the upper storage capacitor electrode 25*d* prevented from being connected to the connection electrode 25L in a direction crossing the direction in which the storage capacitor line 27 extends.

However, the arrangement of the upper storage capacitor electrodes 25*a* through 25*d* of the present invention is not limited to that described in the second embodiment. The upper storage capacitor electrode 25*a* associated with the first subpixel and connected to the connection pixel 25R and the upper storage capacitor electrode 25*c* associated with the second subpixel and connected to the connection electrode 25L may be shifted along the direction in which the storage capacitor line 27 extends.

Figure 12:
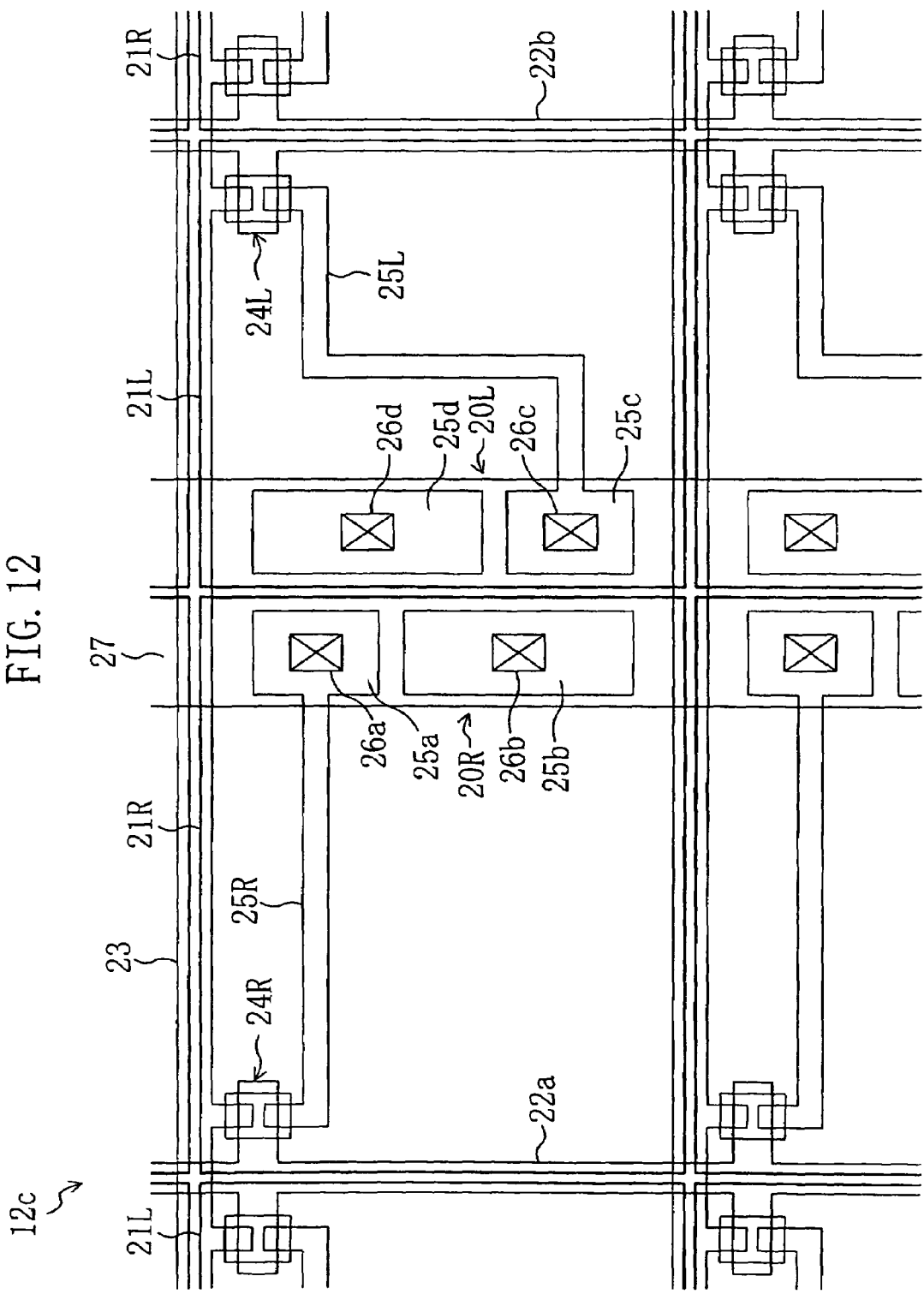
FIG. 12 is a plan view schematically illustrating an AM substrate 12c of a third embodiment.

FIG. 12 is a plan view schematically illustrating an AM substrate 12*c* of this embodiment. For the AM substrate 12*c* of this embodiment, an upper storage capacitor electrode 25*c* associated with a second subpixel and connected to a connection electrode 25L is shifted below an upper storage capacitor electrode 25*a* associated with a first subpixel and connected to a connection electrode 25R only when viewed in this figure. Furthermore, an upper storage capacitor electrode 25*d* associated with the second subpixel and prevented from being connected to the connection electrode 25L is shifted above an upper storage capacitor electrode 25*b* associated with the first subpixel and prevented from being connected to the connection electrode 25R only when viewed in this figure.

Since, in the AM substrate 12*c* of this embodiment, the upper storage capacitor electrode 25*c* is shifted downward when viewed in FIG. 12, the connection electrode 25L through which a drain electrode of a TFT 24L is connected to the upper storage capacitor electrode 25*c* is longer than the connection electrode 25R of the first subpixel. Accordingly, the aperture ratio of the second subpixel may become lower than that of the first subpixel. On condition that the AM substrate 12*c* of this embodiment is used for a liquid crystal display device operating in a MVA mode, if a connection electrode 25L is formed on a region of the AM substrate 12c provided with a slit (provided without an electrode layer) or a region of a counter substrate provided with a rib (projection) projecting toward a liquid crystal layer, this can restrain the aperture ratio from decreasing due to an increase in the length of the connection electrode 25L.

In the second embodiment, as illustrated in FIG. 11, the upper storage capacitor electrodes 25a and 25c connected to the connection electrodes 25R and 25L, respectively, are located close to each other. This may cause current leakage between the upper storage capacitor electrodes 25a and 25c. If a short circuit is caused between the upper storage capacitor electrodes 25a and 25c connected to the connection electrodes 25R and 25L, respectively, any one of the associated subpixels needs to be repaired, thereby displaying the subpixel as a black dot.

For the AM substrate 12c of this embodiment, the upper storage capacitor electrodes 25a and 25c connected to the connection electrodes 25R and 25L, respectively, are located apart from each other as compared with the second embodiment. Therefore, a short circuit is less likely to be caused between the upper storage capacitor electrodes 25a and 25c. On condition that the upper storage capacitor electrodes 25a and 25c connected to the connection electrodes 25R and 25L, respectively, are shorted to the upper storage capacitor electrodes 25b and 25d prevented from being connected to the connection electrodes 25R and 25L, the upper storage capacitor electrodes 25b and 25d prevented from being connected to the connection electrodes 25R and 25L need to be isolated from the upper storage capacitor electrodes 25a and 25c. Although this isolation decreases the storage capacities of the upper storage capacitor electrodes 25b and 25d, it simultaneously allows associated subpixels to be driven and displayed at near normal levels.

Embodiment 4

In the first through third embodiments, the upper storage capacitor electrodes 25a and 25b of the first subpixel are adjacent to the upper storage capacitor electrodes 25c and 25d of the second subpixel in a direction crossing the direction in which the storage capacitor line 27 extends. However, the present invention is not limited to these embodiments. For example, the upper storage capacitor electrodes 25a through 25d may be arranged along the direction in which the storage capacitor line 27 extends.

Figure 13:
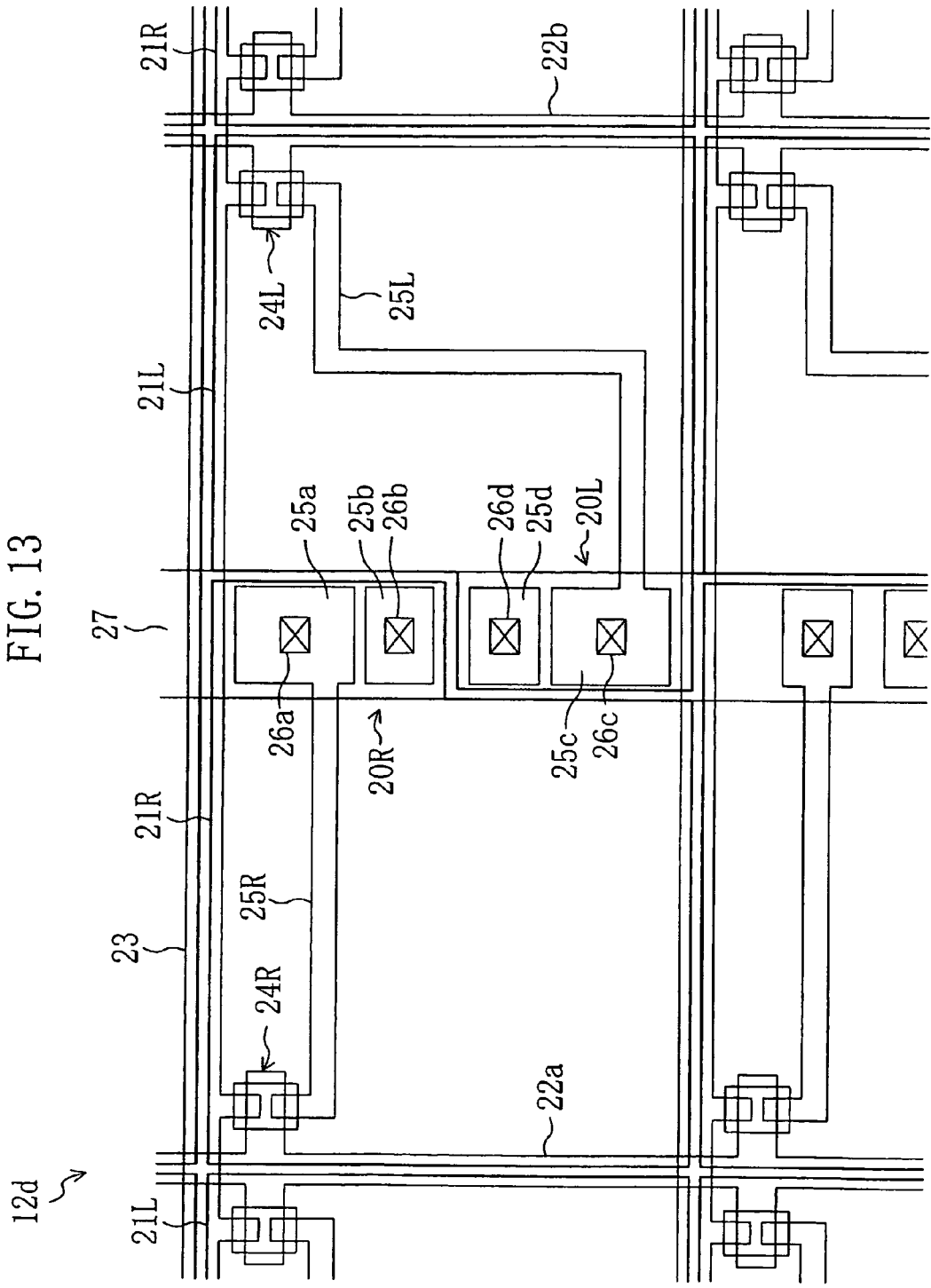
FIG. 13 is a plan view schematically illustrating an AM substrate 12d of a fourth embodiment.

FIG. 13 is a plan view schematically illustrating an AM substrate 12d of this embodiment. For the AM substrate 12d of this embodiment, two upper storage capacitor electrodes 25a and 25b included in a first subpixel are located above two upper storage capacitor electrodes 25c and 25d included in a second subpixel only when viewed in this figure. Furthermore, the upper storage capacitor electrode 25a associated with the first subpixel and connected to a connection electrode 25R is located above the upper storage capacitor electrode 25b associated therewith and prevented from being connected to the connection electrode 25R only when viewed in this figure. On the other hand, the upper storage capacitor electrode 25c associated with a second subpixel and connected to a connection electrode 25L is located below the upper storage capacitor electrode 25d associated therewith and prevented from being connected to the connection electrode 25L only when viewed in this figure.

When, as illustrated in FIG. 13, the upper storage capacitor electrodes 25a through 25d are arranged along the direction in which the storage capacitor line 27 extends, this can reduce the width of the storage capacitor line 27. This width reduction can improve the aperture ratio of each subpixel. Furthermore, since the upper storage capacitor electrodes 25b and 25d are interposed between the upper storage capacitor electrode 25a connected to the connection electrode 25R and the upper storage capacitor electrode 25c connected to the connection electrode 25L, this can prevent a short circuit from being caused between the electrodes 25a and 25c. In a case where the upper storage capacitor electrode 25b of the first subpixel is shorted to the upper storage capacitor electrode 25d of the second subpixel, any one of the storage capacitor electrodes 25b and 25d need to be isolated from subpixel electrodes 21R and 21L. This isolation allows the subpixels to be driven and displayed at near normal levels.

Embodiment 5

In the first through fourth embodiments, two of upper storage capacitor electrodes 25a through 25d are placed in each of first and second subpixels. However, an upper storage capacitor electrode of at least one of two adjacent subpixels may be divided into two or more pieces.

Figure 14:
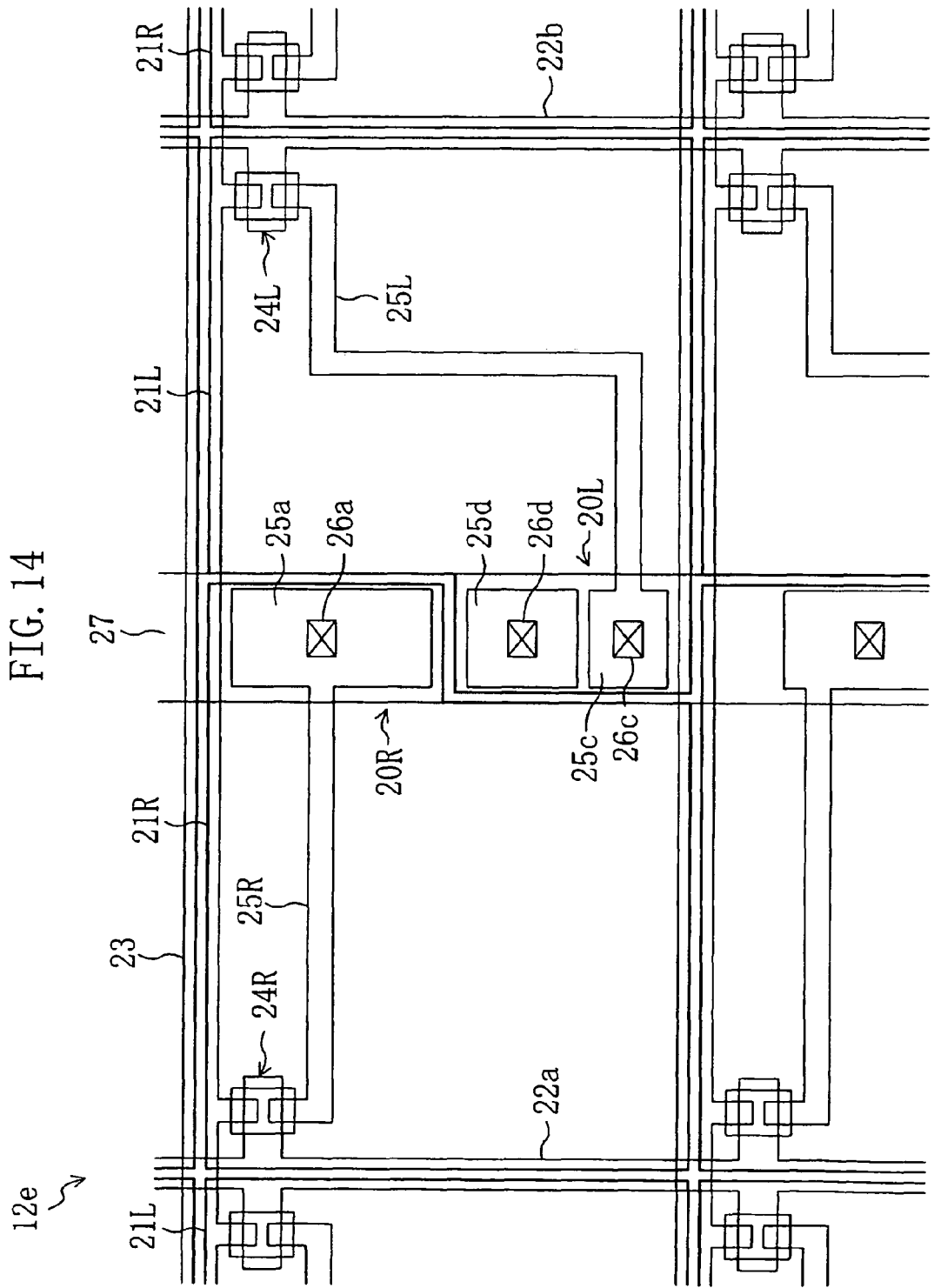
FIG. 14 is a plan view schematically illustrating an AM substrate 12e of a fifth embodiment.

FIG. 14 is a plan view schematically illustrating an AM substrate 12e of this embodiment. For the AM substrate 12e of this embodiment, while a second subpixel has two upper storage capacitor electrodes 25c and 25d, a first subpixel has only one upper storage capacitor electrode 25a connected to a connection electrode 25R. When an upper storage capacitor electrode is divided into two or more pieces, the storage capacity of an associated subpixel is reduced as compared with when an upper storage capacitor electrode is not divided. To cope with this, an upper storage capacitor electrode of only a subpixel in which a short circuit is likely to be caused between the upper storage capacitor electrode and any other element is divided. This can suppress a decrease in the storage capacity of another adjacent subpixel.

Embodiment 6

In each of the embodiments, in a case where a short circuit is caused between upper storage capacitor electrodes, this short circuit can be solved, for example, by removing parts of electrodes in contact holes formed on the shorted upper storage capacitor electrodes. However, in the present invention, the short circuit may be solved by removing shorted part of a liquid crystal display device using the following countermeasure.

Figure 15:
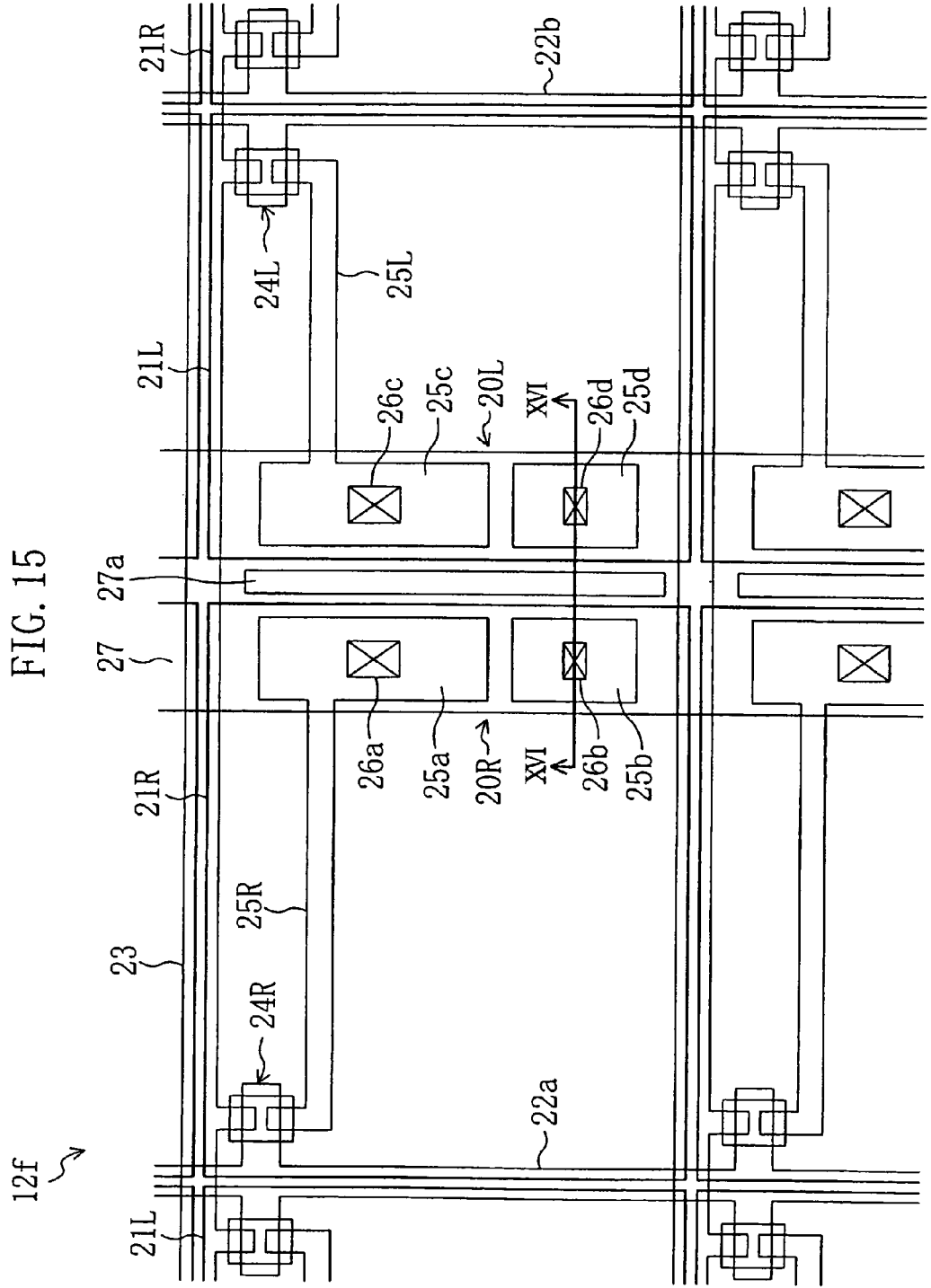
FIG. 15 is a plan view schematically illustrating an AM substrate 12f of a sixth embodiment.
Figure 16:
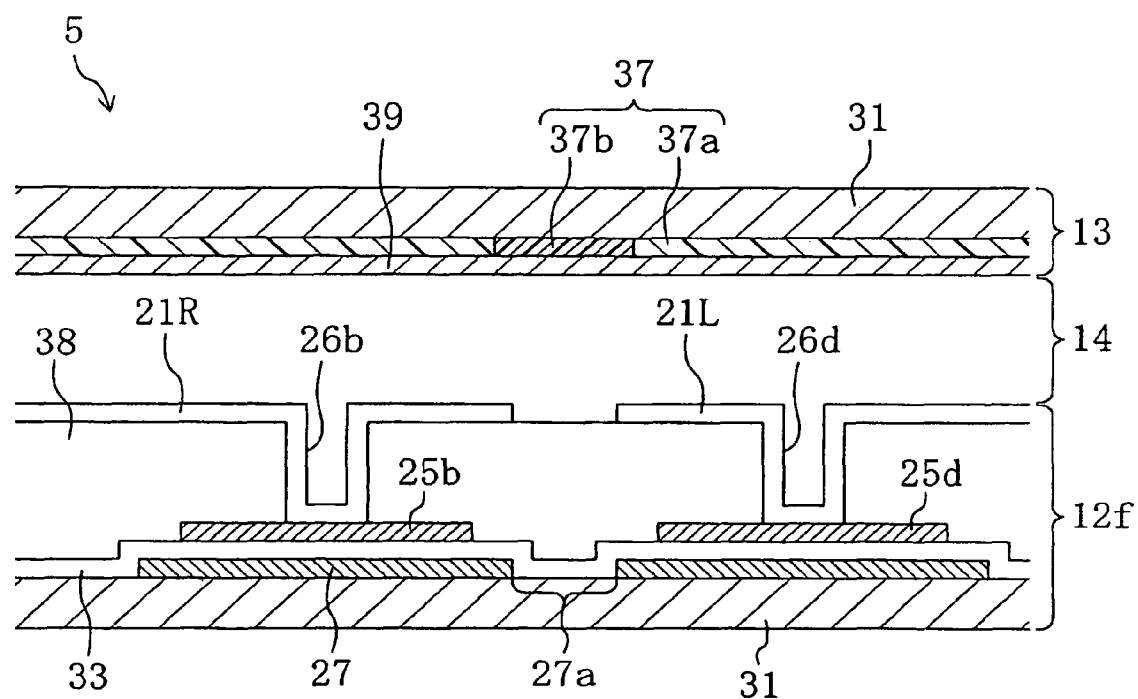
FIG. 16 is a cross-sectional view schematically illustrating a liquid crystal display panel of the fifth embodiment and taken along the line XVI-XVI in FIG. 15.

FIG. 15 is a plan view schematically illustrating an AM substrate 12f of this embodiment. FIG. 16 is a cross-sectional view schematically illustrating the cross section of a liquid crystal display panel 5 of this embodiment taken along the line XVI-XVI in FIG. 15.

As illustrated in FIG. 16, the liquid crystal display panel 5 includes an AM substrate 12f and a counter substrate 13 opposed to each other, and a liquid crystal layer 14 formed between these substrates 12f and 13.

For the AM substrate 12f, each of storage capacitor lines 27 has a slit 27a between a combination of upper storage capacitor electrodes 25a and 25b and a combination of upper storage capacitor electrodes 25c and 25d. The other configuration and effect of the AM substrate 12f are similar to those of the AM substrate 12a described in the first embodiment, and thus description thereof will not be given. The pattern shape of the slit 27a is not limited to that illustrated in FIG. 15 and is appropriately adjusted according to the shapes of the upper storage capacitor electrodes 25a through 25d and the storage capacitor line 27.

The counter substrate 13 takes on a multilayer structure in which a color filter layer 37, a counter electrode 39, an alignment film (not shown), and other films are sequentially stacked on a substrate 31.

The color filter layer 37 includes colored layers 37a each associated with any one of R, G and B and arranged in a matrix pattern to correspond to pixels of the AM substrate 12f and black matrixes 37b each disposed between each adjacent pair of the colored layers 37a. As illustrated in FIG. 16, each black matrix 37b overlaps the slit 27a formed in the AM substrate 12f. In view of the above, for a liquid crystal display device operating in a normally white mode, light can be restrained from leaking through the slit 27a when pixels are displayed in black.

Next, a fabrication method for a liquid crystal display panel 5 of the above-described configuration will be described. The liquid crystal display panel 5 is fabricated through the process steps of producing an AM substrate, producing a counter substrate and producing a liquid crystal display panel. These process steps will be described below. Furthermore, after at least one of the AM substrate production process step and the liquid crystal display panel production process step, a test process step is carried out. When a defective pixel is detected in the test process step, the process step of repairing the defective pixel is added after the test process step.

The AM substrate production process step will be described hereinafter.

First, a metal film made of titanium, chrome, aluminum, molybdenum, tantalum, tungsten, copper, or any other metal, an alloy film of these metals, or a layered film of these films is entirely deposited (to a thickness of 1000 Å through 3000 Å) on a substrate 31 made of glass, plastic, or any other material by sputtering. Then, the deposited film is patterned by photolithography technology (photo engraving process: hereinafter, referred to as a "PEP technology"), thereby providing scanning signal lines 22, gate electrodes 32R and storage capacitor lines 27.

Next, an inorganic insulating film made of silicon nitride, silicon oxide, or any other material is deposited (to a thickness of approximately 3000 Å through 5000 Å) by CVD (chemical vapor deposition) to entirely cover the substrate on which the scanning signal lines 22 and other elements are formed, thereby forming a gate insulating film 33.

Subsequently, an intrinsic amorphous silicon film (having a thickness of 1000 Å through 3000 Å) and an n+ amorphous silicon film (having a thickness of 400 Å through 700 Å) doped with phosphorus are sequentially formed by CVD to entirely cover the gate insulating film 33 covering the substrate. Then, these films are patterned in island forms by PEP technology to cover the gate electrode 32R, thereby forming silicon layered structures composed of the intrinsic amorphous silicon film and the n+amorphous silicon film.

Subsequently, a metal film made of titanium, chrome, aluminum, molybdenum, tantalum, tungsten, copper, or any other metal, an alloy film of these metals, or a layered film of these films is deposited (to a thickness of 1000 Å through 3000 Å) by sputtering to entirely cover the substrate on which the silicon layered structures are formed. Then, the deposited film is patterned by PEP technology, thereby providing data signal lines 23, connection electrodes 25R and 25L and upper storage capacitor electrodes 25a through 25d (storage capacitor electrode formation process step).

Furthermore, the n+ amorphous silicon layer forming parts of the silicon layered structures is partially etched away using the data signal lines 23 and the connection electrodes 25R and 25L as masks, thereby forming a channel portion of a TFT. In this manner, a semiconductor layer having a source electrode 36a and a drain electrode 36b is formed (channel portion formation process step).

The semiconductor layer may be formed of an amorphous silicon film as described above. Alternatively, it may be formed of a polysilicon film. Furthermore, an amorphous silicon film or a polysilicon film may be laser annealed, resulting in its crystallinity improved. In this manner, the speed of electrons traveling through the semiconductor layer is increased, resulting in the characteristics of a TFT 24 improved.

Next, an inorganic insulating film made of silicon nitride, silicon oxide, or any other material is deposited (to a thickness of 2000 Å through 5000 Å) by CVD to entirely cover the substrate on which the data signal lines 23 and other elements are formed. Alternatively, a photosensitive acrylic resin (having a thickness of 2 μm through 4 μm) may be formed by die coating (coating). In this manner, an interlayer insulating film 38 is formed.

Then, parts of the interlayer insulating film 38 corresponding to the upper storage capacitor electrodes 25a through 25d are etched away, thereby forming contact holes 26a through 26d.

Subsequently, a transparent conductive film made of ITO (indium tin oxide), IZO (indium zinc oxide), zinc oxide, tin oxide, or any other material is deposited (to a thickness of 1000 Å through 2000 Å) by sputtering to entirely cover the interlayer insulating film 38 which is formed on the substrate and in which the contact holes 26a through 26d are formed. Then, the transparent conductive film is patterned by PEP technology, thereby forming pixel electrodes 21R and 21L.

Finally, a polyimide resin with a thickness of 500 Å through 1000 Å is printed to entirely cover the substrate on which the pixel electrodes 21R and 21L are formed, then baked and rubbed along one direction by a rubbing cloth, thereby forming an alignment film.

In the above-described manner, an AM substrate 12f is produced (fabricated).

The counter substrate production process step will be described hereinafter.

First, a chrome thin film or a resin containing a black pigment is formed to entirely cover a substrate 31 made of glass, plastic, or any other material and then patterned by PEP technology, thereby forming black matrixes 37b.

Next, a colored layer 37a (with a thickness of approximately 2 μm) corresponding to any one of red, green and blue is patterned between each adjacent pair of the black matrixes by a pigment dispersion method. In the above-mentioned manner, a color filter layer 37 is formed.

Subsequently, a transparent conductive film made of ITO, IZO, zinc oxide, tin oxide, or any other material is deposited (to a thickness of approximately 1000 Å) to entirely cover the color filter layer 37, thereby forming a counter electrode 39.

Finally, a polyimide resin having a thickness of 500 Å through 1000 Å is printed to entirely cover the counter electrode 39, then baked and rubbed along one direction by a rotation cloth, thereby forming an alignment film.

In the above-mentioned manner, a counter substrate 13 can be produced.

<Liquid Crystal Display Panel Production Process Step>

The liquid crystal panel production process step will be described hereinafter.

First, a sealant made of a thermosetting epoxy resin or any other material is applied to one of the AM substrate 12f and the counter substrate 13 produced in the above-mentioned manner by screen printing to form a frame-like pattern provided with a liquid crystal inlet. Spherical spacers each having a diameter equal to the thickness of a liquid crystal layer 14 and made of plastic or silica are distributed over the other substrate.

Next, the AM substrate 12f and the counter substrate 13 are bonded to each other, and the sealant is cured, thereby producing an empty liquid crystal display panel.

Finally, liquid crystal material is injected into the empty liquid crystal display panel by an evacuation method, and then a UV-curable resin is applied to the liquid crystal inlet to enclose the liquid crystal material by UV application. In this manner, a liquid crystal layer 14 is formed.

The liquid crystal display panel 5 is produced (fabricated) in the above-described manner.

The test process step and the defect repair process step will be described hereinafter.

First, a description will be given of a case where the test process step (short-circuited portion detection process step) is carried out after the AM substrate production process step (before the formation of an alignment film).

In this short-circuited portion detection process step, the AM substrate 12f produced in the AM substrate production process step is subjected to a visual test, an electrooptical test or other tests, thereby detecting the location at which a short circuit is caused (a short-circuited portion of the AM substrate). The visual test herein indicates optical test of a line pattern using a CCD camera or any other method. The electrooptical test herein indicates that a line pattern is electrooptically inspected in the following method: A modulator (electrooptical element) is placed so as to be opposed to an active matrix substrate, and then a voltage is applied between the active matrix substrate and the modulator while light is allowed to be incident therebetween, and variations in the intensity of the light are captured by a CCD camera.

Figure 17:
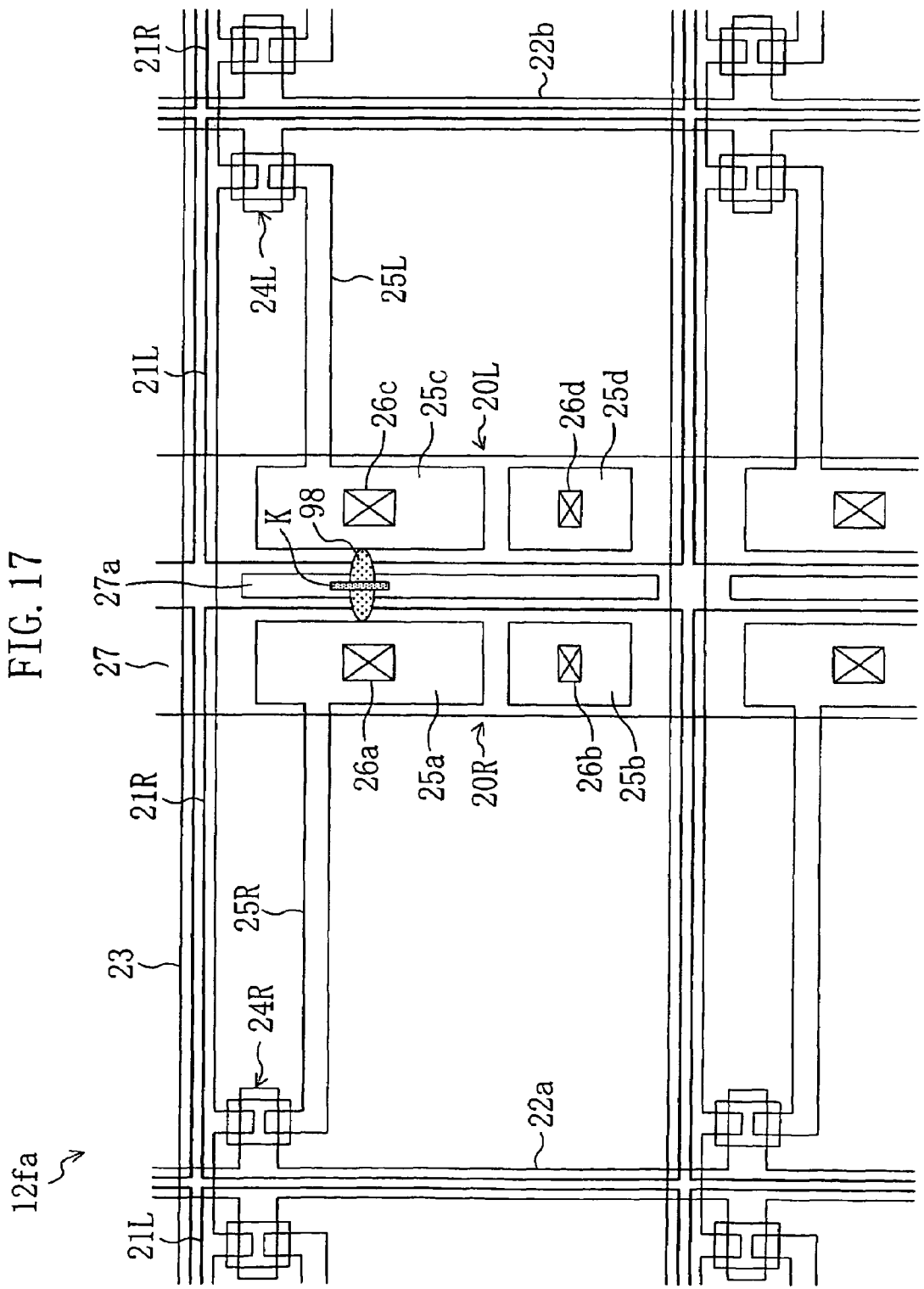
FIG. 17 is a plan view for schematically explaining a repair process step for the AM substrate 12f of the sixth embodiment in a case where a short circuit is caused between upper storage capacitor electrodes 25a and 25c.

Subsequently, the detected defect is repaired by removing the detected short-circuited portion of the AM substrate 12f. In this embodiment, a repair method for a short circuit caused between upper storage capacitor electrodes 25a and 25c of an AM substrate 12fa will be described with reference to FIG. 17.

To be specific, laser light is applied through a slit 27a to an unnecessarily left part 98 of a film that is a short-circuited portion of the AM substrate 12fa, thereby isolating the shorted upper storage capacitor electrodes 25a and 25c from each other. In this way, the isolated upper storage capacitor electrodes 25a and 25c perform as well as upper storage capacitor electrodes 25a and 25c of a normal pixel.

In order to cut the unnecessarily left part 98 of the film, for example, the fourth harmonic (having a wavelength of 266 nm) of an yttrium aluminum garnet (YAG) laser is used. Use of the YAG laser allows the short-circuited portion to be cut by laser application with excellent accuracy.

The slit 27a preferably has a width of 5 µm or more and an area of 25 µm² or more. The width of the slit 27a means the length of the slit 27a along the direction in which data signal lines 23 extend. The area to which laser light is applied when the short-circuited portion is cut by a YAG laser can be secured proportionally to the above-mentioned width. Furthermore, in view of the diameter of a light beam to be applied by a YAG laser and alignment for laser application, the slit 27a preferably has a width of 10 µm or more and an area of 100 µm² or more.

The test process step and the defect repair process step may be carried out, not after the formation of pixel electrodes 21R and 21L, but after the process step of forming upper storage capacitor electrodes 25a through 25d or after the process step of forming a channel portion. Thus, a defective pixel can be repaired earlier in a process for fabricating a liquid crystal display panel, resulting in the production yields of AM substrates and liquid crystal display panels further improved.

Next, a description will be given of a case where the test process step (short-circuited portion detection process step) is carried out after the liquid crystal display panel production process step.

In this short-circuited portion detection process step, the liquid crystal display panel 5 produced in the liquid crystal panel production process step is subjected to a lighting test, thereby detecting a short-circuited portion of the liquid crystal display panel 5. To be specific, for example, a gate test signal (bias voltage of −10V; pulse voltages of +15V with pulse width of 50 µsec at a frequency of 16.7 msec) is input to the scanning signal lines 22 to turn on all the TFTs 24. Further, a source test signal of ±2 V potential whose polarity is inverted every 16.7 msec is applied to the data signal lines 23, whereby the electric charge corresponding to ±2 V is written in the pixel electrode 21 through the source electrode 36a and the drain electrode 36b of each TFT 24. At the same time, a counter electrode test signal, which is a DC (direct current) signal of −1 V potential, is input to the counter electrode 39 and the storage capacitor line 27. As a result, a voltage is applied to the liquid crystal capacitor formed between the pixel electrodes 21R and 21L and the counter electrode 39 and the storage capacitor element formed between the storage capacitor line 27 and the upper storage capacitor electrodes 25a through 25d, and a pixel forming these pixel electrodes 21R and 21L enters the ON state. At the location where a short circuit is caused between respective upper storage capacitor electrodes of adjacent pixels (e.g., between upper storage capacitor electrodes 25a and 25c), associated pixel electrodes 21L and 21R become electrically continuous, resulting in combined defects. In this manner, the location of a short-circuited portion of the AM substrate 12f is detected.

Subsequently, the detected defect is repaired by removing the detected short-circuited portion of the AM substrate 12f. A specific repair method will not be described in details because it is substantially the same as the above-mentioned repair method for the defect detected during or after the production of the AM substrate 12f. In the case of the repair for the defect detected during or after the production of the AM substrate 12f, laser light can be applied through both the top and back surfaces of the AM substrate 12f to the AM substrate 12f. On the other hand, in the case of repair for the defect detected after the production of the liquid crystal display panel 5, laser light is applied through the surface of the AM substrate 12f located at the substrate 31 side (the back surface of the AM substrate 12f) to the AM substrate 12f.

As described above, according to the AM substrate 12f of this embodiment, in a case where a short circuit is caused between the upper storage capacitor electrodes 25a and 25c or between the upper storage capacitor electrodes 25b and 25d, laser light is applied through the slit 27a to the unnecessarily left part 98 of a film that is the short-circuited portion. In this manner, a defective pixel can be easily repaired. Accordingly, the production yields of AM substrates and liquid crystal display panels can be improved.

In a case where the unnecessarily left part 98 of the film between a combination of the upper storage capacitor electrodes 25a and 25b and a combination of the upper storage capacitor electrodes 25c and 25d is formed of only a high-resistance semiconductor film, such as an amorphous silicon film, the unnecessarily left part 98 of the film is hardly changed into a channel by the potential supplied to the storage capacitor line 27. The reason for this is that the storage capacitor line 27 is provided with the slit 27a. In view of the above, the occurrence of combined defects can be suppressed even without the above-mentioned repair using laser light. To the contrary, in a case where the storage capacitor line 27 is not provided with the slit 27*a*, the unnecessarily left part 98 of the high-resistance semiconductor film is changed into a channel so that the associated pair of upper storage capacitor electrodes become electrically continuous. The reason for this is that the storage capacitor line 27 functions as a gate electrode and the pair of upper storage capacitor electrodes function as a source electrode and a drain electrode.

Embodiment 7

Figure 18:
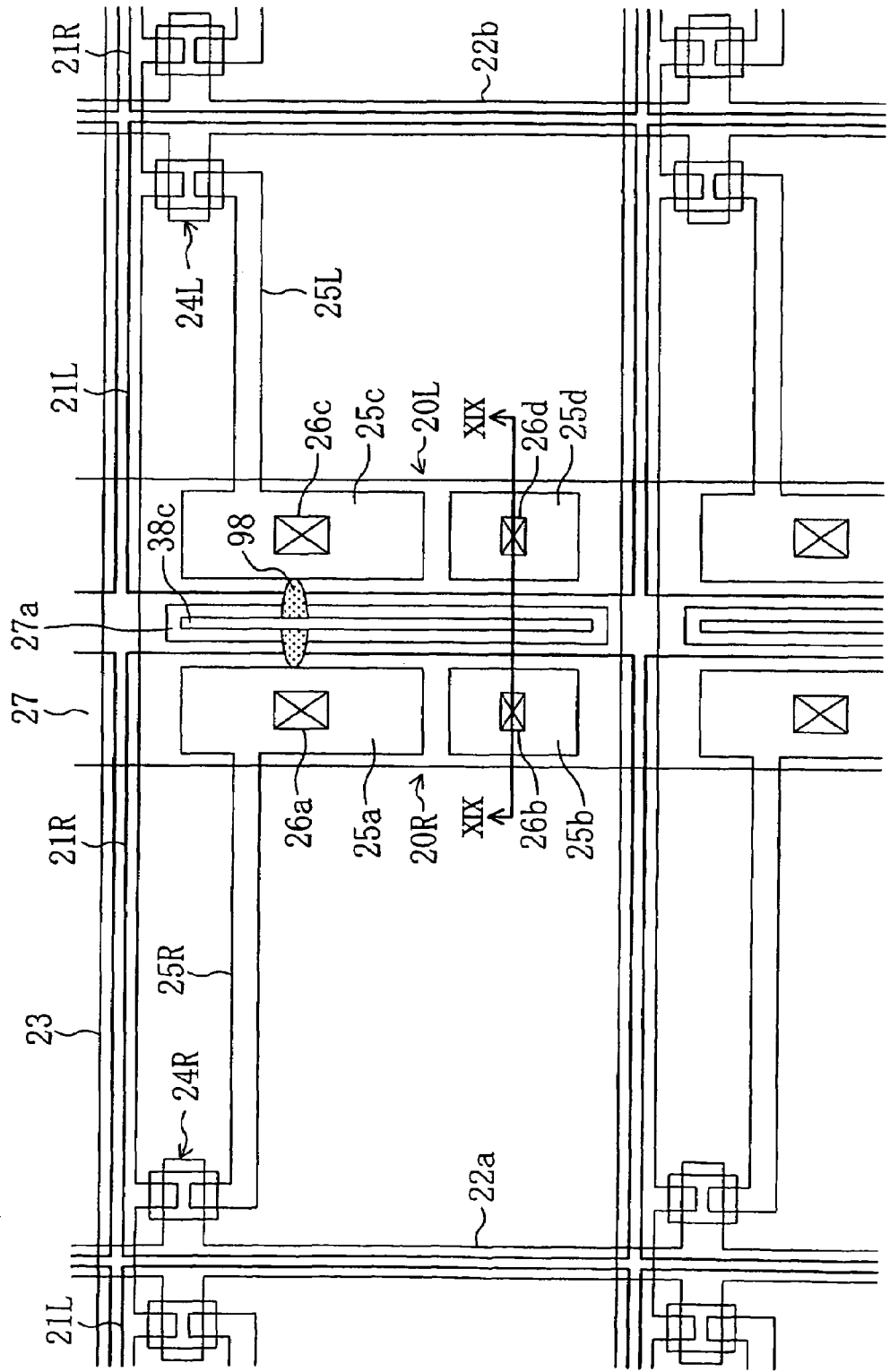
FIG. 18 is a plan view schematically illustrating the AM substrate 12g of the seventh embodiment.
Figure 19:
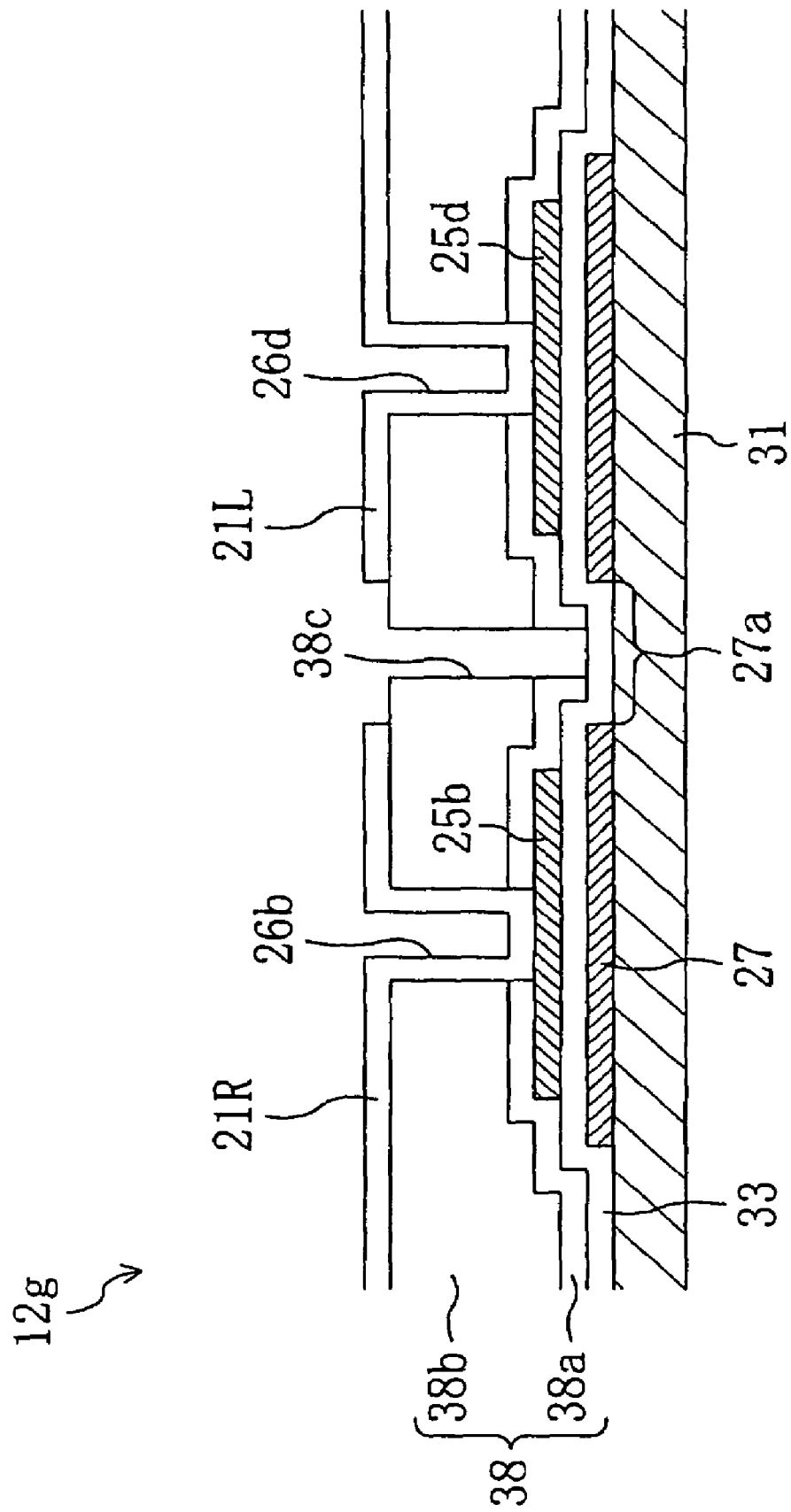
FIG. 19 is a cross-sectional view taken along the line XIX-XIX in FIG. 18.

FIG. 18 is a plan view schematically illustrating an AM substrate 12*g* of this embodiment. FIG. 19 is a cross-sectional view taken along the line XIX-XIX in FIG. 18.

For this AM substrate 12*g*, as illustrated in FIG. 19, an interlayer insulating film 38 takes on a double-layer structure of a lower first interlayer insulating film 38*a* and a upper second interlayer insulating film 38*b* and has a slit 38*c* overlapping a slit 27*a* of a storage capacitor line 27. The other configuration and effect of the AM substrate 12*g* are similar to those of the AM substrate 12*a* described in the first embodiment, and thus their description will not be given.

In order to form the first interlayer insulating film 38*a*, an inorganic insulating film made of silicon nitride, silicon oxide, or any other material is deposited (to a thickness of 2000 through 5000 Å) by CVD. In order to form the second interlayer insulating film 38*b*, a photosensitive acrylic resin is deposited (to a thickness of 2 through 4 µm) by die coating.

The slit 38*c* is formed in the interlayer insulating film 38 simultaneously with the formation of respective contact holes 26*a* through 26*d* of the upper storage capacitor electrodes 25*a* through 25*d*. To be specific, first, the photosensitive acrylic resin forming the second interlayer insulating film 38*b* is patterned, and subsequently the inorganic insulating film forming the first interlayer insulating film is subjected to dry etching using the patterned photosensitive acrylic resin as a mask, thereby forming the interlayer insulating film 38 having the contact holes 26*a* through 26*d* and the slit 38*c*.

In the above-mentioned etching process for forming the contact holes 26*a* through 26*d* and other elements, the unnecessarily left part 98 formed between any adjacent pair of the upper storage capacitor electrodes 25*a* through 25*d* can also be removed. Thus, the short-circuited portion can be removed by usual etching without cutting the short-circuited portion by laser application.

Embodiment 8

Figure 20:
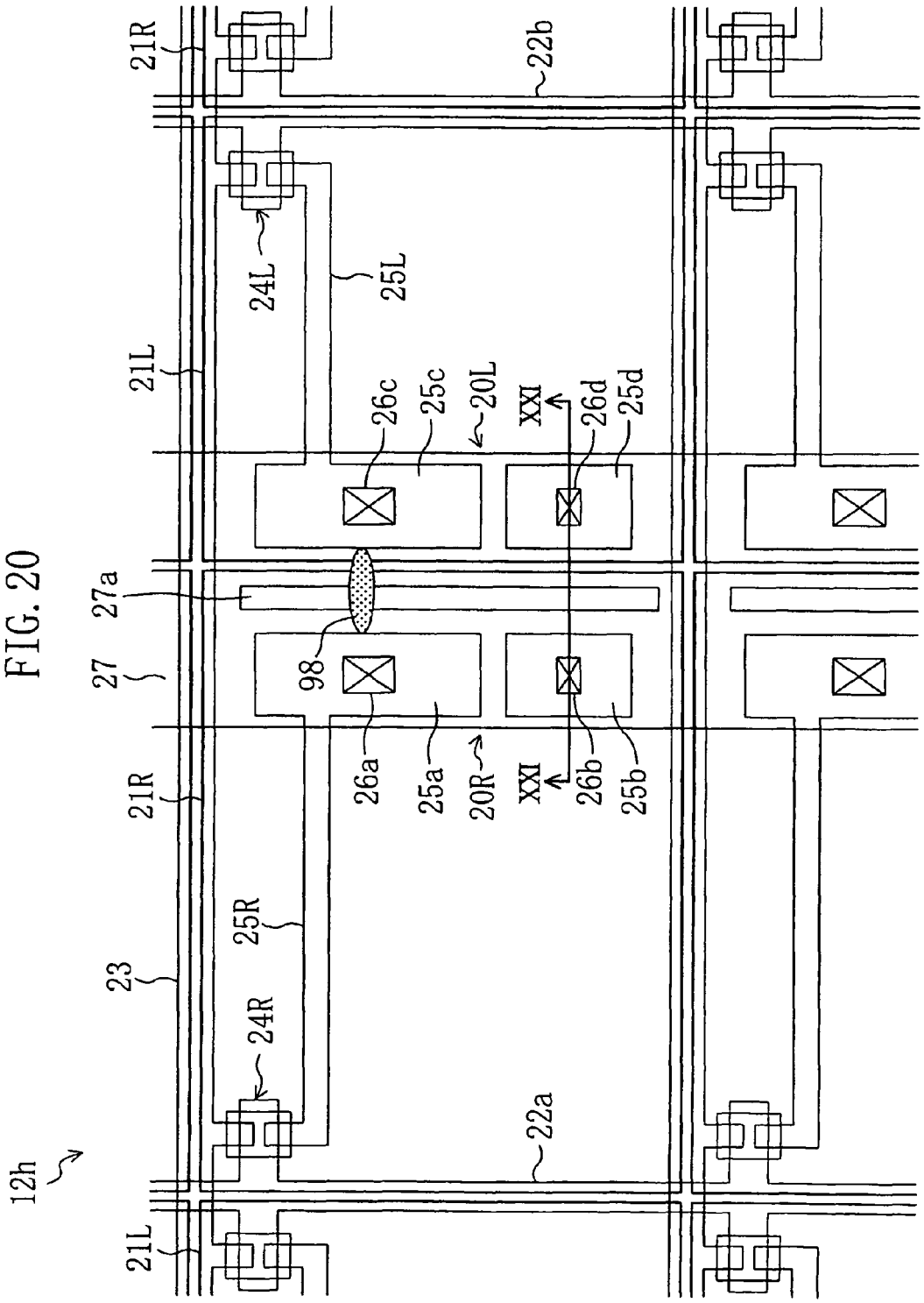
FIG. 20 is a plan view schematically illustrating an AM substrate 12h of an eighth embodiment.
Figure 21:
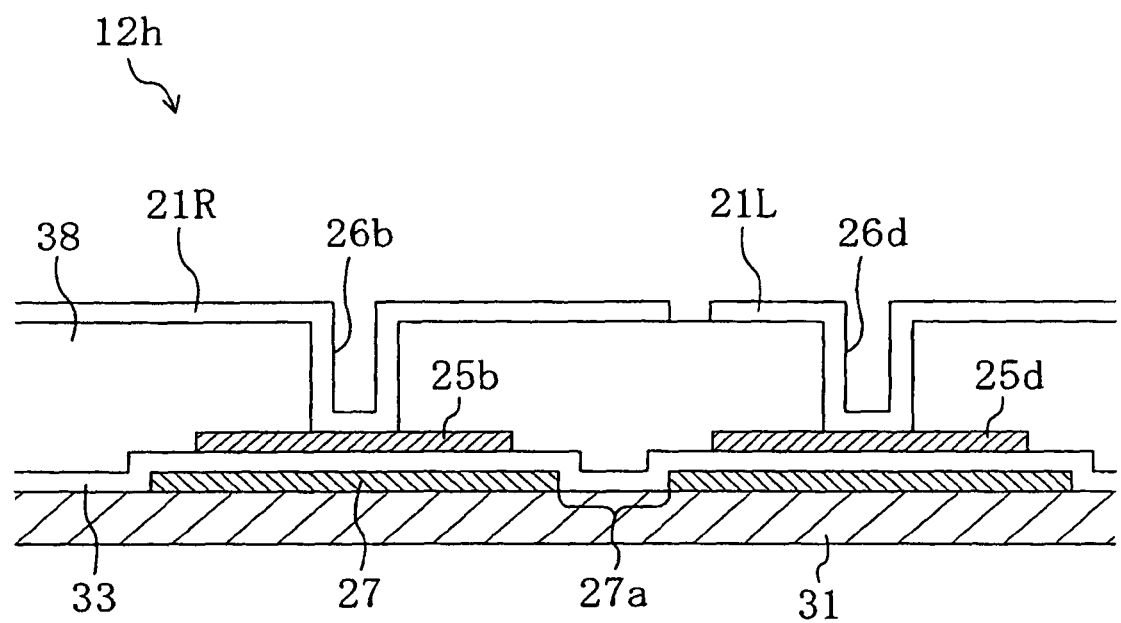
FIG. 21 is a cross-sectional view taken along the line XXI-XXI in FIG. 20.

FIG. 20 is a plan view schematically illustrating the AM substrate 12*h* of this embodiment. FIG. 21 is a cross-sectional view taken along the line XXI-XXI in FIG. 20.

For this AM substrate 12*h*, as illustrated in FIG. 21, a subpixel electrode 21R overlaps a slit 27*a* of a storage capacitor line 27. The other configuration and effect of the AM substrate 12*h* are similar to those of the AM substrate 12*a* described in the first embodiment, and thus their description will not be given.

According to the AM substrate 12*h*, since the subpixel electrode 21R overlaps the slit 27*a*, laser light is applied through the surface of the AM substrate 12*h* located at the substrate 31 side (the back surface of the AM substrate 12*h*) to the AM substrate 12*h*. Furthermore, when the AM substrate 12*h* is applied to a liquid crystal display device operating in a normally white mode, light can be restrained from leaking when a pixel is to be displayed in black. This can suppress deterioration in display quality and restrain the aperture ratio of a pixel from being reduced.

Embodiment 9

Figure 22:
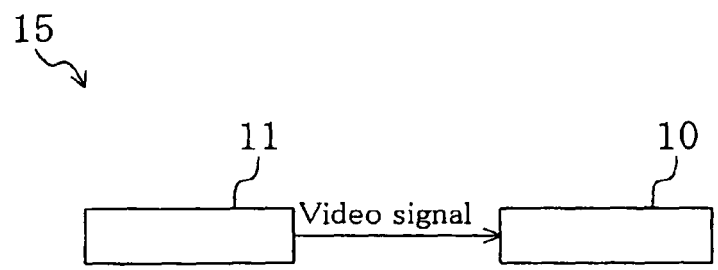
FIG. 22 is a block diagram illustrating a television device 15 of a ninth embodiment.

FIG. 22 is a block diagram illustrating a television device 15 of this embodiment. As illustrated in FIG. 22, the television device 15 includes a tuner 11 for receiving a television broadcast and outputting a video signal and a liquid crystal display device 10 for displaying an image based on the video signal supplied from the tuner 11.

Figure 23:
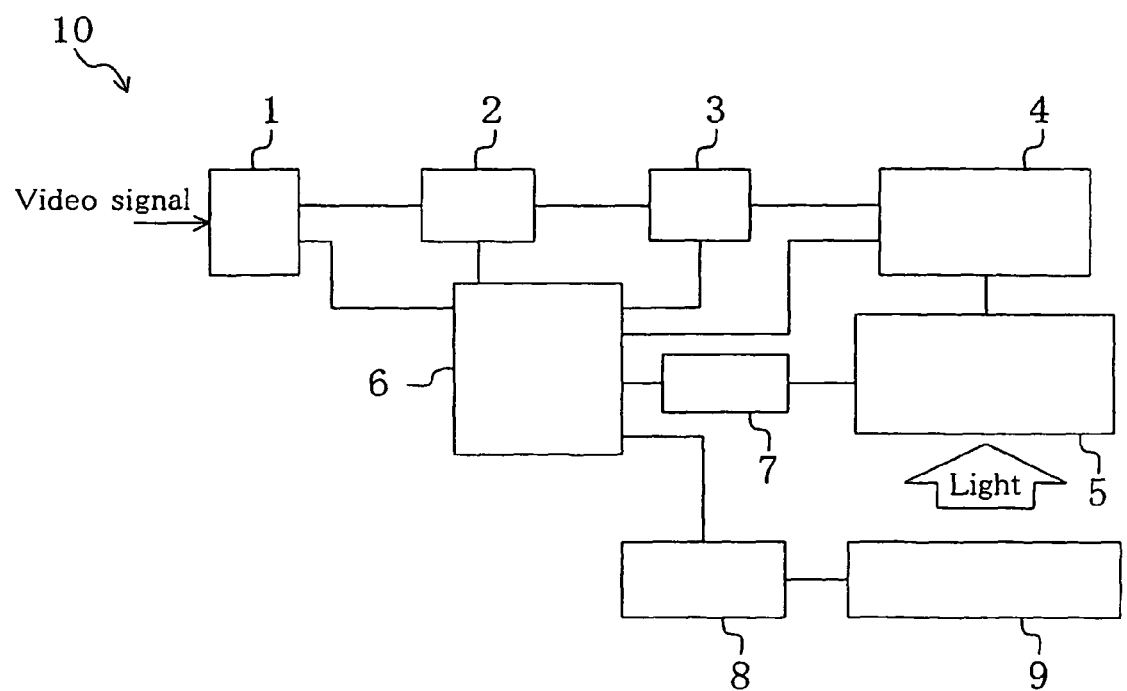
FIG. 23 is a block diagram illustrating a liquid crystal display device 10 of the ninth embodiment.
Figure 24:
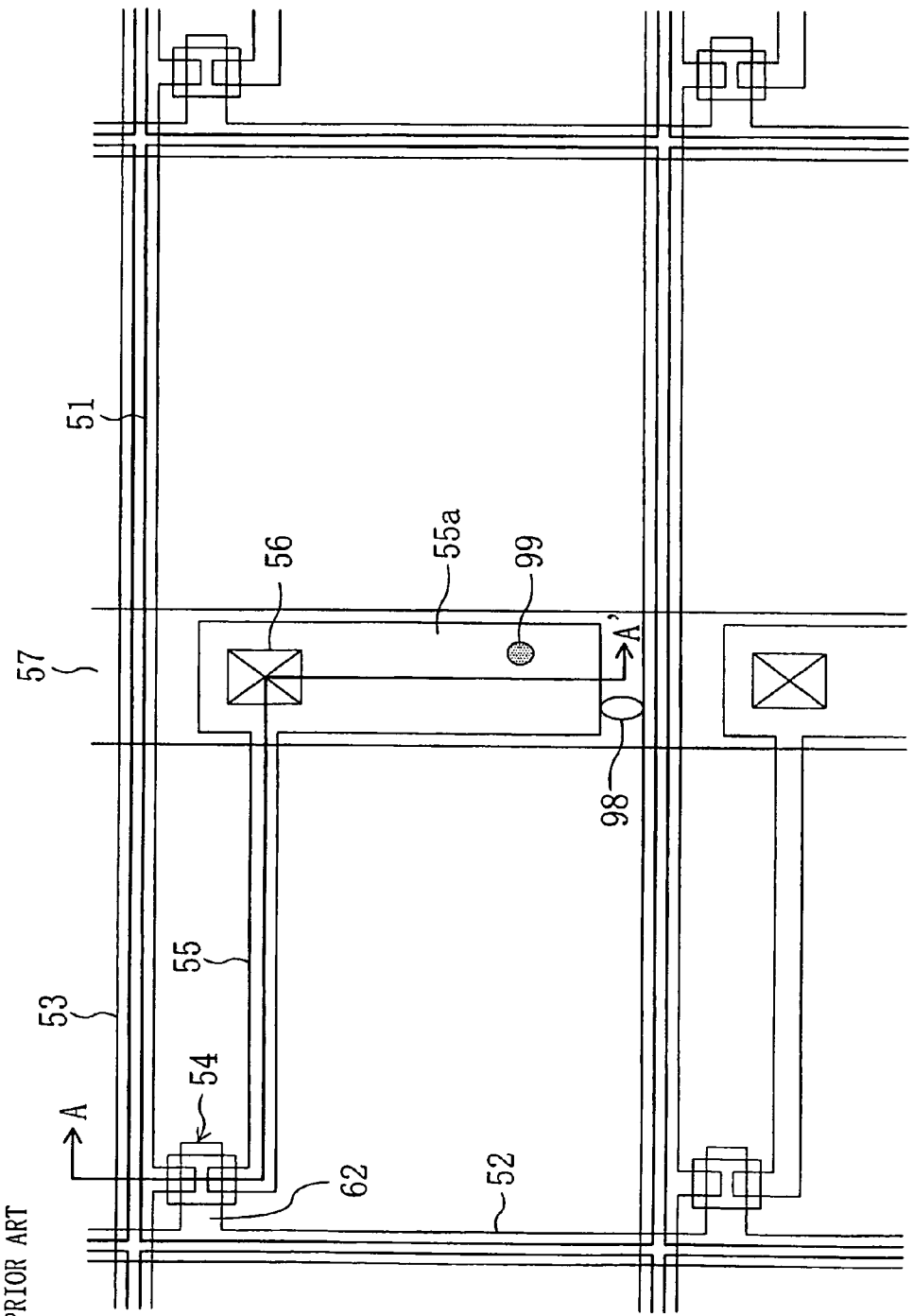
FIG. 24 is a schematic plan view illustrating the configuration of a portion of an AM substrate which corresponds to a pixel, includes a storage capacitor element and is used for a known AM type liquid crystal display device.
Figure 25:
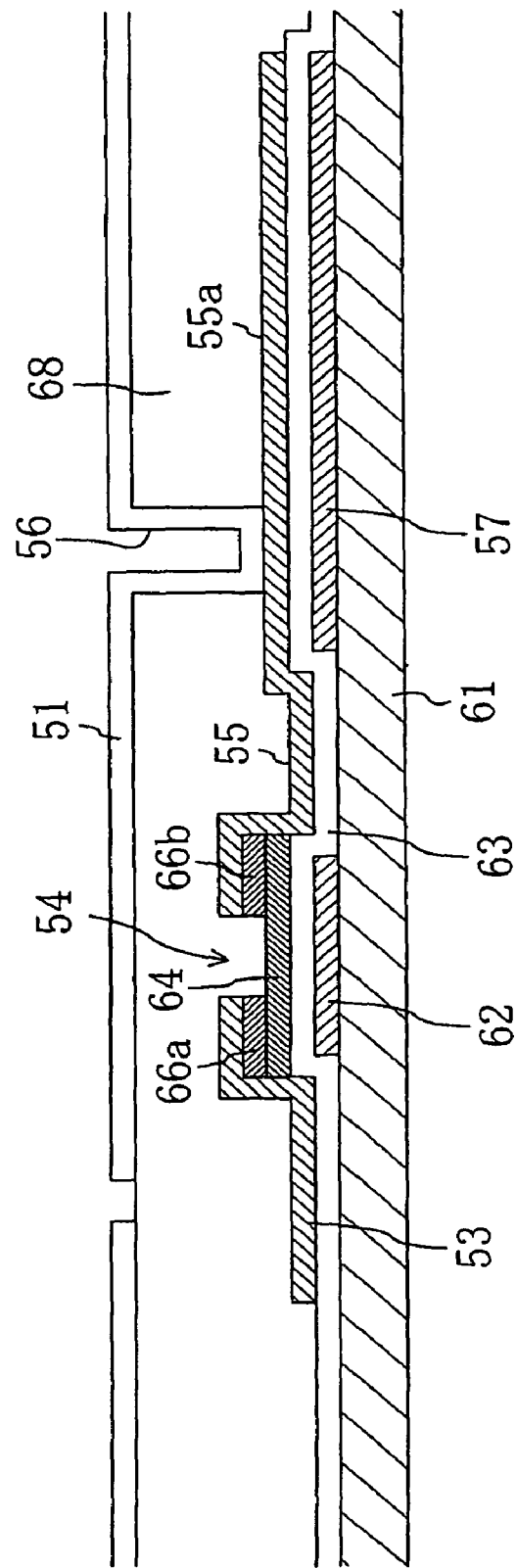
FIG. 25 is a cross-sectional view schematically illustrating the cross section of the AM substrate taken along the line A-A' in FIG. 24.
Figure 26:
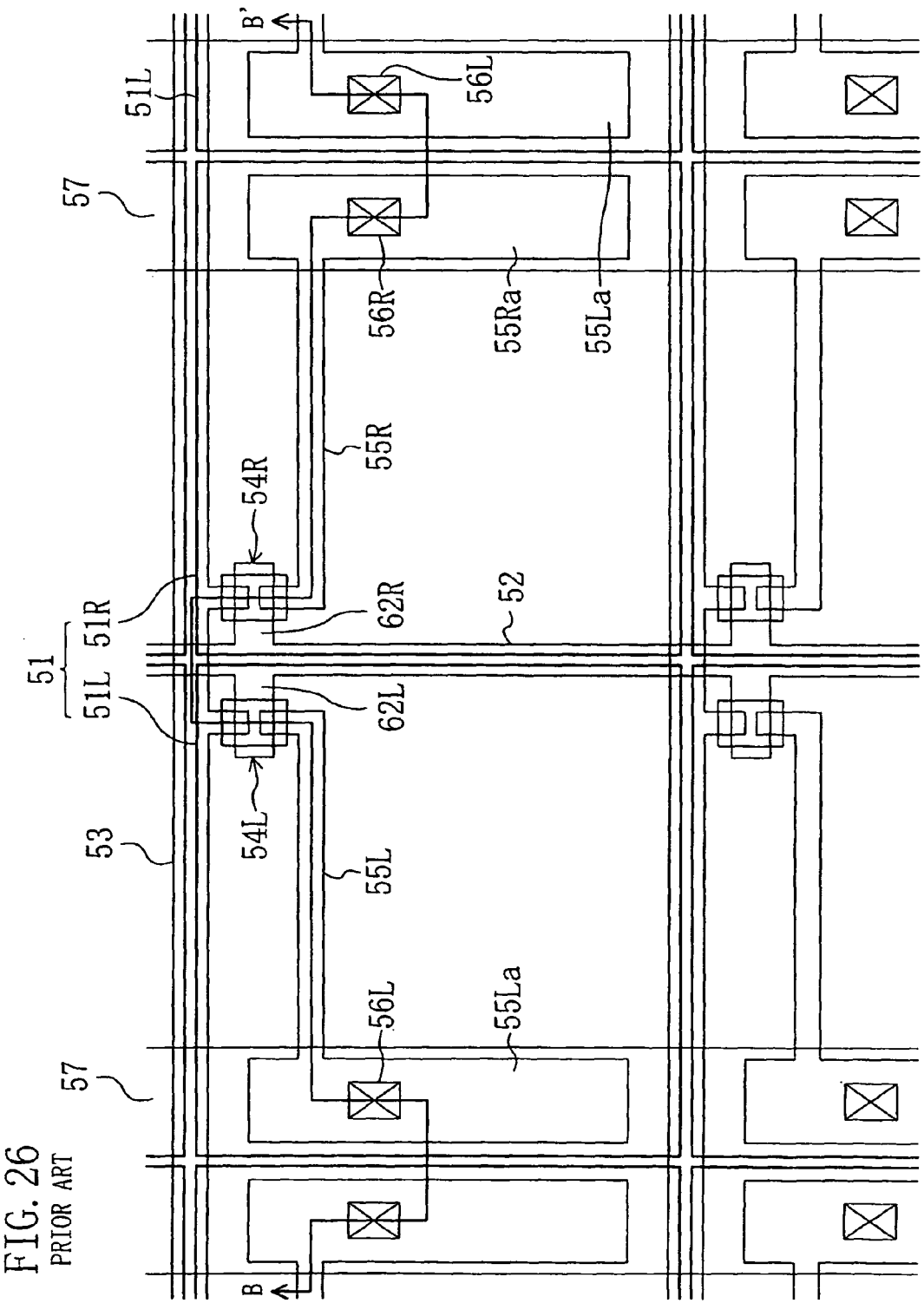
FIG. 26 is a plan view schematically illustrating the configuration of a portion of an AM substrate corresponding to a pixel divided into a plurality of subpixels.
Figure 27:
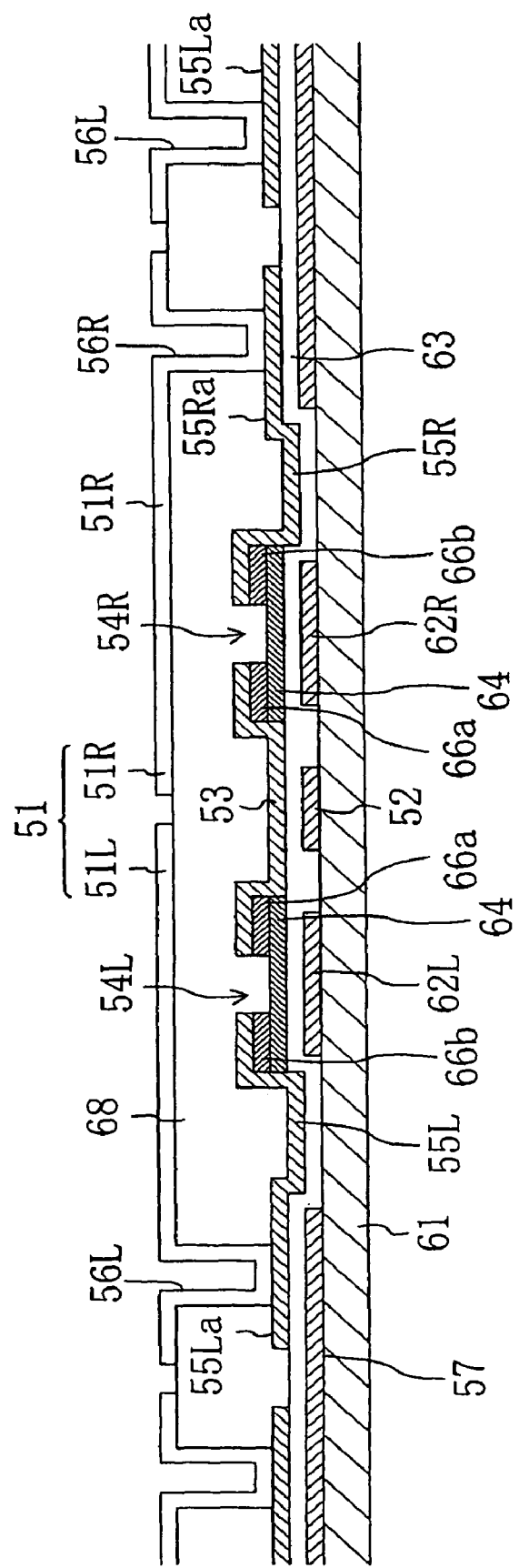
FIG. 27 is a cross-sectional view schematically illustrating the cross section of the AM substrate taken along the line B-B' in FIG. 26.

FIG. 23 is a block diagram illustrating the liquid crystal display device 10 of this embodiment.

As illustrated in FIG. 23, the liquid crystal display device 10 includes a Y/C separation circuit 1 for separating the video signal supplied from the tuner 11 or the like into a luminance signal and a color signal, a video chroma circuit 2 for converting the luminance signal and the color signal into an analog RGB signal corresponding to one of the three primary colors of light, i.e., R, G or B, an A/ID converter 3 for converting the analog RGB signal into a digital RGB signal, a liquid crystal controller 4 to which the digital RGB signal is fed, a liquid crystal display panel 5 to which the digital RGB signal is fed through the liquid crystal controller 4 at a predetermined time and which includes an AM substrate 12, described in the above-mentioned embodiments, for substantially displaying an image, a gray scale circuit 7 for supplying a gray scale voltage to the liquid crystal display panel 5, a backlight 9 for supplying light to the liquid crystal display panel 5, a backlight drive circuit 8 for driving the backlight 9, and a microcomputer 6 for controlling the whole system of the above-mentioned configuration.

Not only a video signal based on a television broadcast as described above but also other various video signals, such as a video signal for video taken by a camera and a video signal supplied through an internet line, can be utilized as the video signal supplied to the Y/C separation circuit 1.

The television device 15 of the above-mentioned configuration includes a liquid crystal display device 10 having an AM substrate in which a defective pixel is easily repaired. This can improve the production yields of television devices and liquid crystal display devices.

Although the preferred embodiments of the present invention have been described, the technical scope of the present invention is not limited to that described in the above embodiments. It should be understood by those skilled in the art that the above embodiments are exemplary only, and that various modifications may be further made to combinations of the foregoing components and processes and such modifications are also intended to fall within the technical scope of the present invention.

INDUSTRIAL APPLICABILITY

An AM substrate of the present invention is applicable to liquid crystal display devices, inorganic or organic EL display devices, or other devices. A liquid crystal display device of the present invention is applicable to various electrical apparatuses, such as portable telephones, PDAs (personal digital assistances), personal computers, thin TV sets, medical displays, car navigation systems, amusement apparatuses, or other apparatuses.

The invention claimed is:

1. An active matrix substrate comprising: a substrate; first and second active elements formed on the substrate; first and second storage capacitor elements formed on the substrate; an interlayer insulating film covering the first and second storage capacitor elements; and first and second pixel electrodes formed on the interlayer insulating film to be adjacent to each other, a data signal line being connected via the first active element to the first pixel electrode, the data signal line being connected via the second active element to the second pixel electrode, wherein the first and second storage capacitor elements include a shared storage capacitor line and an insulating film formed on the storage capacitor line, the first storage capacitor element has a first electrode opposed to the storage capacitor line with the insulating film interposed therebetween, the first electrode is electrically connected via a contact hole formed in the interlayer insulating film to the first pixel electrode, the second storage capacitor element has a second electrode opposed to the storage capacitor line with the insulating film interposed therebetween, the second electrode is electrically connected via a contact hole formed in the interlayer insulating film to the second pixel electrode, and between the first and second electrodes, a third electrode opposed to the storage capacitor line with the insulating film interposed therebetween is provided.

2. The active matrix substrate of claim 1, wherein the first electrode is connected to a drain electrode of the first active element via a connection electrode, the second electrode is connected to a drain electrode of the second active element via a connection electrode, and the third electrode is at least one of an electrode electrically connected to the first pixel electrode via a contact hole formed in the interlayer insulating film, and an electrode electrically connected to the second pixel electrode via a contact hole formed in the interlayer insulating film.

3. The active matrix substrate of claim 1, wherein the first, second, and third electrodes are arranged in a row along the storage capacitor line.

4. The active matrix substrate of claim 1, wherein in each pixel, the storage capacitor line is in a rectangular shape when viewed in plan.

5. The active matrix substrate of claim 1, wherein the first and second pixel electrodes are formed in different shapes from each other.

6. The active matrix substrate of claim 1, wherein the first and second pixel electrodes formed to have different area sizes from each other.

7. The active matrix substrate of claim 1, wherein a gap between the first and second pixel electrodes overlaps at least a part of a gap between the first electrode and the second electrode.

8. A display device comprising: the active matrix substrate of claim 1; a counter electrode opposed to the active matrix substrate; and a display medium layer placed in the gap between the active matrix substrate and the counter electrode, wherein the same electrical potential is applied to the storage capacitor line and the counter electrode.

9. A television device comprising the display device of claim 8.

10. A liquid crystal display device comprising: the active matrix substrate of claim 1; a counter substrate whose one surface is formed with a counter electrode opposed to the active matrix substrate; and a liquid crystal layer placed in the gap between the active matrix substrate and the counter substrate.

11. The liquid crystal display device of claim 10, wherein the same electrical potential is applied to the storage capacitor line and the counter electrode.

12. The liquid crystal display device of claim 11, wherein the liquid crystal layer is a vertical alignment type liquid crystal layer containing nematic liquid crystal material having a negative dielectric anisotropy.

13. The liquid crystal display device of claim 12 driven in a normally black mode.

14. The liquid crystal display device of claim 10, wherein different electrical potentials are applied to the storage capacitor line and the counter electrode.

15. The liquid crystal display device of claim 14, wherein the liquid crystal layer is a twist-aligned liquid crystal layer containing nematic liquid crystal material having a positive dielectric anisotropy.

16. The liquid crystal display device of claim 15 driven in a normally white mode.

17. A television device comprising the liquid crystal display device of claim 10.

* * * * *